United States Patent
Jacobs

(10) Patent No.: US 11,876,780 B2
(45) Date of Patent: Jan. 16, 2024

(54) DYNAMIC EMERGENCE, SYNCHRONIZATION, AND CONSOLIDATION OF REGISTRATION AND SECURITY AUTHORITIES AMONG NODES OF AN AD HOC PEER NETWORK

(71) Applicant: Quixotic Holdings, LLC, Fife, WA (US)

(72) Inventor: Anthony Samuel Jacobs, Olney, MD (US)

(73) Assignee: QUIXOTIC HOLDINGS, LLC, Fife, WA (US)

( * ) Notice: Subject to any disclaimer, the term of this patent is extended or adjusted under 35 U.S.C. 154(b) by 227 days.

(21) Appl. No.: 17/489,444

(22) Filed: Sep. 29, 2021

(65) Prior Publication Data
US 2023/0099926 A1     Mar. 30, 2023

(51) Int. Cl.
| | |
|---|---|
| G06F 9/00 | (2006.01) |
| G06F 15/16 | (2006.01) |
| G06F 17/00 | (2019.01) |
| H04L 9/40 | (2022.01) |

(52) U.S. Cl.
CPC .......... H04L 63/0209 (2013.01); H04L 63/06 (2013.01); H04L 63/0892 (2013.01)

(58) Field of Classification Search
CPC .. H04L 63/06; H04L 63/0892; H04L 63/0209
USPC ......................................................... 726/11
See application file for complete search history.

(56) References Cited

U.S. PATENT DOCUMENTS

| | | |
|---|---|---|
| 10,178,509 B1 | 1/2019 | Perdew et al. |
| 2017/0180355 A1* | 6/2017 | Enns ................ H04L 63/10 |
| 2020/0344217 A1* | 10/2020 | Luther .............. H04L 9/0894 |

OTHER PUBLICATIONS

Mills et al., "Network Time Protocol Version 4: Protocol and Algorithms Specification," *Internet Engineering Task Force*, Jun. 2010, 95 pages.

Mills, "Internet Time Synchronization: The Network Time Protocol," *IEEE Transactions On Communications*, 39(10): 1482-1493, Oct. 1991.

Mills, David L., Computer Network Time Synchronization: The Network Time Protocol, CRC Press Taylor & Francis Group, LLC, Boca Raton, FL, 2006, 311 pages.

Network Time Foundation's NTP Support Wiki, accessed Aug. 18, 2023, 4 pages.

* cited by examiner

*Primary Examiner* — Jeffrey C Pwu
*Assistant Examiner* — Samuel Ambaye
(74) *Attorney, Agent, or Firm* — Seed IP Law Group LLP

(57) ABSTRACT

A facility controlling a communication device to create a disconnected ad hoc network and then to rejoin an internetwork is described. The communication device makes a direct or indirect wireless connection with a participant in a network in which the communication device was formerly a participant. In response to making the connection, the communication device: (1) communicates with a registration authority of the network to synchronize a provisional registration authority state established by the first communication device during a period after the communication device was formally a participant in the network and before the connection was made; and (2) communicates with a security authority of the network to synchronize a security authority state established by the communication device during the period.

22 Claims, 20 Drawing Sheets

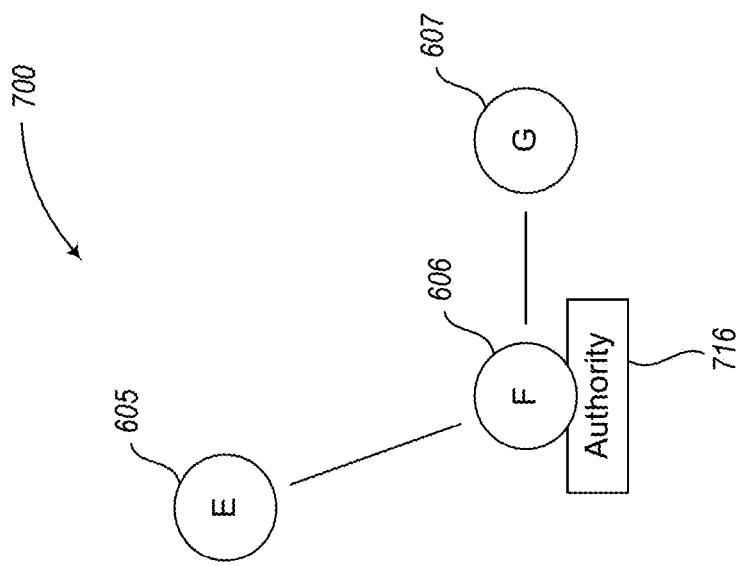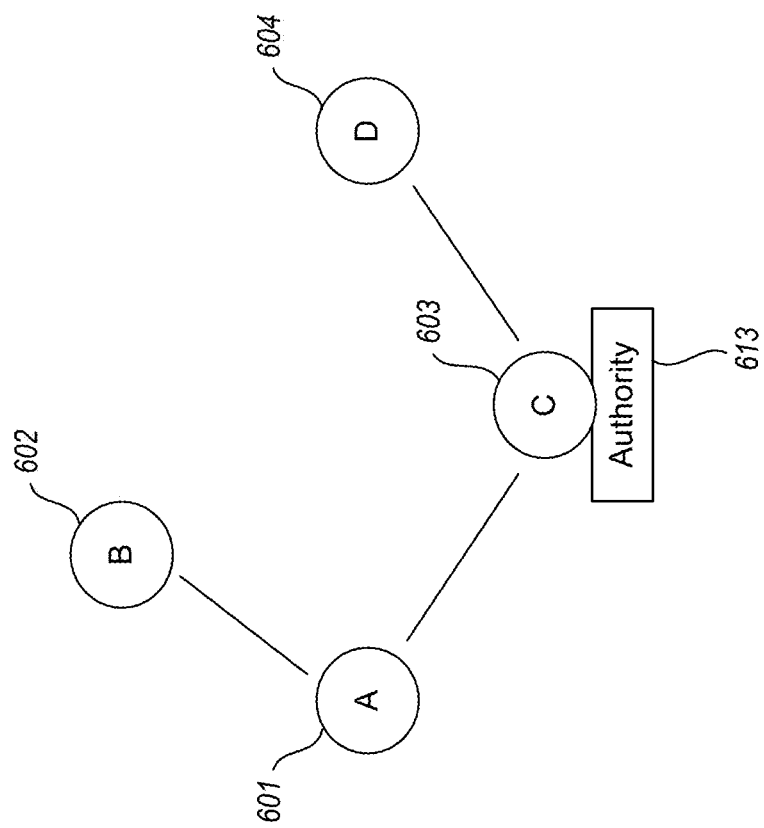
FIG. 7

DYNAMIC EMERGENCE, SYNCHRONIZATION, AND CONSOLIDATION OF REGISTRATION AND SECURITY AUTHORITIES AMONG NODES OF AN AD HOC PEER NETWORK

BACKGROUND

Mobile communication devices such as smart phones have become an integral part of the lives of many people; the number of mobile communication devices in use continues to grow. These mobile communication devices are powerful computers that can connect via various data paths and protocols.

It is typical for mobile communication devices to connect with the Internet and each other by communicating directly with cellular base stations or wireless access points. When they do so, they commonly interact with networks that are managed centrally, rigorously, and consistently.

BRIEF DESCRIPTION OF THE DRAWINGS

FIG. 7 is a network diagram showing a sample environment in which the facility operates at a second time.

DETAILED DESCRIPTION

Figure 1A:
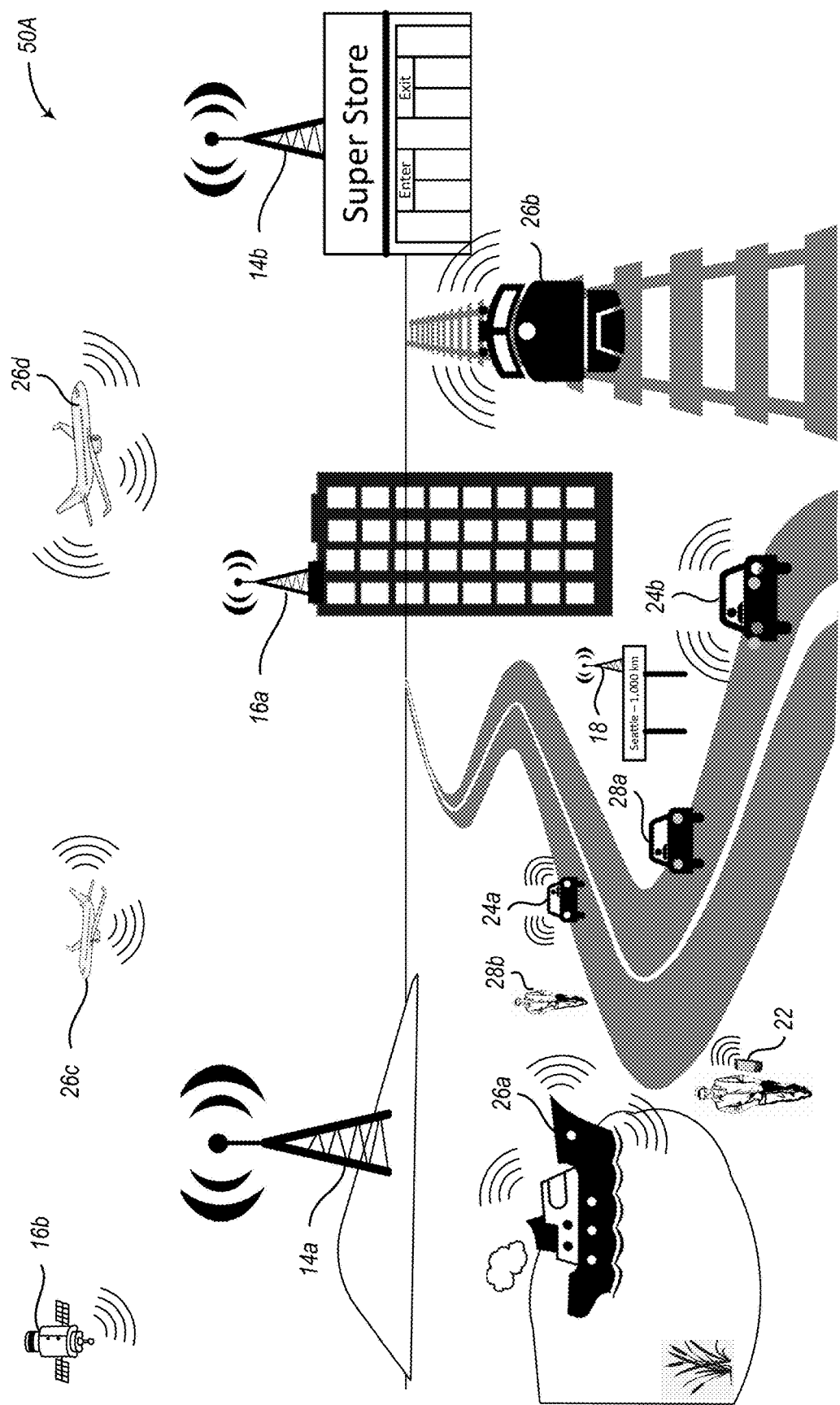
FIGS. 1A-1B illustrate context diagrams of an environment for establishing an ad hoc mesh network in accordance with embodiments described herein.

The inventors have recognized that the conventional approach in which mobile communication devices only communicate directly with cellular base stations or dedicated wireless access points is unnecessarily limiting. For example, there are geographic locations where no cellular base stations or wireless access points are permanently sited, or otherwise consistently operating. Additionally, under some conditions, cellular base stations and wireless access points (collectively referred to as "base stations" below) can become disabled, or their performance can be limited in a way that reduces their range and/or bandwidth. For example, base stations can become performance-limited or disabled by power outages or reductions, breaks in wired network links upon which they depend, failure of hardware or software components, adverse weather, natural disasters, human conflicts, or intentional sabotage.

In response to recognizing this disadvantage of conventional wireless networking, the inventors have conceived and reduced to practice a software, firmware, and/or hardware facility ("the facility") for operating ad hoc wireless networks—such as mesh networks, also called peer networks or peer-to-peer networks—in which mobile communication devices ("network participants, "mobile participants," or "participants") communicate directly with one another. These mobile communication devices may also be referred to as "nodes." Nodes are able to dynamically join the network as participants when they are moved to a location near other participants; are switched on; have their radios enabled; disconnect from a different network; etc. Participants can leave the network when they are moved to a location that is too far away to contact any other participants; are switched off; have their radios disabled; are connected to a different network; etc.

In various embodiments, the facility is implemented as software and/or firmware installed and operating in participants, such as software and/or firmware that manages one or more ad hoc mesh networks; in some embodiments, aspects of the facility that support one or more ad hoc mesh networks are installed and operate in computing systems other than network participants. In various embodiments, the mesh networks operated by the facility are wireless networks, line-of-sight networks of other types, or wired or guided networks.

In some embodiments, the networks established and operated by the facility are capable of being connected to the Internet or other internetworks where one of the participants in the network is connected to the Internet or other internetworks; on the other hand, where none of the participants in a network established and operated by the facility is connected to the Internet or another internetwork, the network is capable of operating independently, based solely on the resources of its participants.

In some embodiments, the facility establishes certain specialized roles, each to be filled by a proper subset of participants in a network, such as one participant in the network. These roles relate to services that are desirable to provide within a network, such as a routing service that routes messages in the network; a time service that provides time-of-day information in the network; a participant registration service that registers nodes as participants in the network; and echo service that repeats back messages sent to and from within the network; and third-party application services that provide information, processing, storage, etc., that relate to a third-party application, such as a third-party application service that maintains an address book for a third-party chat application. A network participant providing one of these types of service is sometimes referred to as an "authority" for this service. For example, a network participant providing routing service to its network is identified as a routing authority for the network; a participant providing time service to its network is identified as a time authority for the network; etc.

In some embodiments, the facility causes a participant to become an authority of a particular type for its network based upon a self-election process that occurs in the network. This process is discussed in detail in US Pre-grant Patent Publication No. 2023/0096395 of U.S. patent application Ser. No. 17/489,437, entitled "DISTRIBUTED ROUTING ELECTIONS," filed on Sep. 29, 2021 (patent counsel's application number 960115.408), which is hereby incorporated by reference in its entirety. In cases where particular contents of a document incorporated herein by reference conflict with the present patent application, the present application controls. In some embodiments, the facility's self-election process for authorities causes authorities of each needed type to dynamically emerge in a network. This can occur, for example, in cases where a new network is created; a participant serving as an authority for a network, then leaves that network, such as when the network becomes divided into multiple smaller networks, or a participant is switched off; more authorities of the involved type come to be needed in the network; etc.

In some embodiments, the facility also responds to a node that is an authority becoming connected to a network that already has one or more authorities of the same type. This can happen, for example, where the authority node is moved from a location where it is able to connect to a first network to a location where it is able to connect to a second network, but not the first network; where a first network in which the node is an authority becomes joined to a second network, either through the authority node or a separate node that can bridge the two networks; etc. In such situations, the facility causes multiple authority nodes of the same type in the same network to synchronize their state, enabling each of the authority nodes to operate successfully with respect to the entire network. Following such synchronization, the multiple authority nodes can all continue to operate as authorities, or the facility can consolidate authorities of this type, if all are not needed, by removing authority status from one or more of the multiple authority nodes. In some embodiments, the facility causes the remaining authorities, and/or other participants in the network, to be notified of this removal of authority status. In some embodiments, the facility also performs such consolidation in cases where multiple authorities of a certain type have been operating in the network for a time, and demand for the corresponding service the clients in the network.

Additional details about dynamic emergence, synchronization, and consolidation of network authorities generally are discussed in US Pre-grant Patent Publication. No. 2023/0099207 of U.S. patent application Ser. No. 17/489,440, entitled "DYNAMIC EMERGENCE, SYNCHRONIZATION, AND CONSOLIDATION OF SPECIALIZED AUTHORITIES AMONG NODES OF AN AD HOC PEER NETWORK," filed on Sep. 29, 2021 (patent counsel's application number 960115.410), which is hereby incorporated by reference in its entirety.

In some embodiments, the facility manages the coordinated dynamic emergence, synchronization, and consolidation of registration and security authorities. Registration authorities register nodes as participants in a network by determining whether they are qualified to participate on the basis of a license that governs which nodes may be admitted to the network. Where a registration authority decides to register a node as a participant, it provides a chain of trust to that node that indirectly extends trust to the node from a trust root designated by the facility. The trust root is a node from which all trust in the networks operated by the facility derives. Typically, the trust root is identified by a root certificate: a public key certificate that identifies the trust root as root certificate authority. The facility can issue multiple certificates in the form of a tree structure. A root certificate is the top-most certificate of the tree, the private key of which is used to "sign" other certificates. Certificates signed by the root certificate inherit the trustworthiness of the root certificate—a signature by a root certificate is analogous to "notarizing" identity in the physical world. Such a certificate is called an intermediate certificate or subordinate CA certificate. Certificates further down the tree also depend on the trustworthiness of the intermediates. The root certificate is often made trustworthy by some mechanism other than a certificate, such as by secure physical distribution. For example, some root certificates are distributed in operating systems by their manufacturers. Microsoft distributes root certificates belonging to members of the Microsoft Root Certificate Program to Windows desktops and Windows Phone 8. Apple distributes root certificates belonging to members of its own root program.

Security authorities each create a series of network keys for a network that are used to encrypt and decrypt messages sent within the network. A security authority receives requests for the current network key for its network by nodes, and grants these requests for nodes whose trust chains the security authority find adequate. In some embodiments, a security authority finds a trust chain adequate if it shows trust from the trust root, through the registration authority, to the requesting node.

In particular, the facility permits a node that was fully enrolled and operating in a network having proper registration and security authorities, then departed, to use the credentials it acquired to establish and operate a new network with new nodes that it encounters. In particular, in some embodiments, even where it was not a registration or security authority in the old network, the departed node appoints itself provisional registration authority to provisionally register the new nodes, and appoints itself security authority to issue network keys to the new nodes. In cases where the departed node arrives at a network that has an operating registration authority or an operating security authority, the departed node may appoint itself only the authority type that is missing. If it turns out to be possible to make a future wireless connection between the old and new networks, the facility synchronizes and reconciles the registration authority of the old network with the provisional registration authority of the new network, and synchronizes and reconciles the security authorities of the two networks. This enables the new nodes to operate on the old network, such that all old and new nodes can communicate.

For at least a short period, the combined network has multiple operating registration authorities and multiple operating security authorities. These can either all continue to operate—in some embodiments taking ongoing synchronization actions to maintain their synchronization—or certain of them can make determinations to withdraw. Where a registration or security authority withdraws, the remaining registration or security authority or authorities carry on serving these functions without assistance from the withdrawn ones, such that all the nodes can continue to communicate. In some embodiments, the withdrawn authority notifies the other nodes in the network or the other nodes that it provided registration or security credentials that it is no longer operating as a registration authority or security authority.

By operating in some or all of the ways described above, the facility provides registration and security services needed in an ad hoc peer network in a way that is responsive to the changing makeup of the network. It is able to do so in the absence of any provision of services or organizational efforts by geographically-remote servers or other devices, enabling its networks to operate successfully without internetwork connectivity. This, in turn, renders its networks capable of operating effectively in isolated areas that don't generally have the benefit of internetwork connectivity, or areas affected by connectivity outages caused by power outages or reductions, breaks in wired network links, failure of hardware or software components, adverse weather, natural disasters, human conflicts, or intentional sabotage.

In each of the ways outlined above, the facility improves the functioning of computer or other hardware, such as by reducing the dynamic display area, processing, energy storage, data storage, and/or data transmission resources needed to perform a certain task, thereby enabling the task to be permitted by less capable, capacious, and/or expensive hardware devices, and/or be performed with less latency, and/or preserving more of the conserved resources for use in performing other tasks or additional instances of the same task. For example, by operating specialized authorities, the facility eliminates redundant use of processing and storage resources that would be consumed if each network participant needed to provide its own network services, or if a larger number of participants needed to provide network services to the network as a whole.

In some embodiments, the facility operates in wireless mesh networks, or wireless ad hoc networks—in which wireless communication devices ("communication devices," "network participants, "mobile participants," or "participants") communicate directly with one another without relying on centralized management of the network.

As referred to herein, a "participant" is an object that includes a computing device that can communicate specific, predetermined types of information and data to other participant objects via wireless or other communications means. In some embodiments, each participant may be a member of a universal service-level agreement to identify which objects are participants, which allows for participants to communicate with one another without having to get user authorization for each individual connection between participants.

As discussed in more detail herein, participants can be mobile or stationary and may include computing devices of different sizes having different computing or networking capabilities. Throughout this disclosure, the term "participant" is used interchangeably with "participant object" and "participant computing device" and "node" and other related variations, and the term "non-participant" is used interchangeably with "non-participant object" and other related variations.

As referred to herein, "line-of-sight communication" refers to wireless or wired transmission of information from a participant to another participant without other retransmission devices. A line-of-sight communication may also be referred to as a single hop from one participant to another participant or a direct communication between participants. Accordingly, line-of-sight is the maximum range one participant can communicate wirelessly with another participant without significant data loss. Examples of wireless transmissions used in line-of-sight communications include Bluetooth, Wi-Fi, ADSB, TCAS, or other protocols now known or developed in the future. In some embodiments, all communications between participants utilize a common protocol.

Figure 1B:
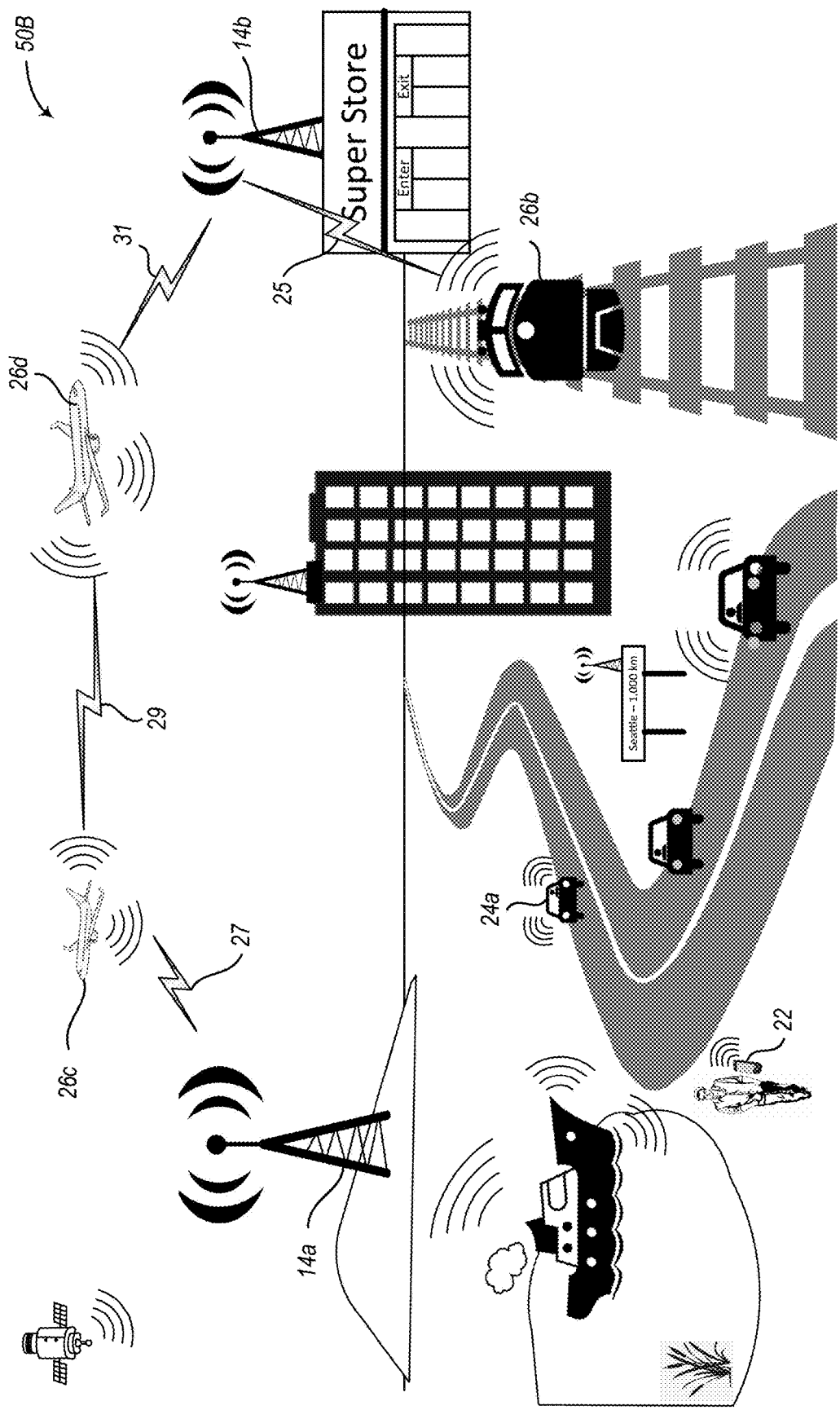

FIGS. 1A-1B illustrate context diagrams of an environment for establishing an ad hoc mesh network in accordance with embodiments described herein. In various embodiments, the facility may implement some or all embodiments described herein with respect to generating and maintaining the ad hoc mesh network. Environment 50A in FIG. 1A includes a plurality of mobile participants (referenced in some figures as mobile participants 36), a plurality of stationary participants (referenced in other figures as stationary participants 34), and a plurality of non-participants 28a-28b. As mentioned above, the stationary participants and the mobile participants can communicate specific types of information or data with one another, but cannot communicate the same types of information with the non-participants 28a-28b.

The plurality of mobile participants includes tier 1 mobile participants 22, tier 2 mobile participants 24, and tier 3 mobile participants 26. The three tiers of mobile participants are generally separated by the computing and networking capabilities of the computing devices associated with the mobile participant. The computing and networking capabilities may be limited or determined by the amount of power available or utilized by a mobile computing device, the amount of processing power available, the size or type or accuracy of the antenna utilized, etc.

For example, tier 1 mobile participants typically have the smallest available power, lowest processing power, lowest bandwidth, shortest ranged antenna, lowest power output, lowest accuracy, and slowest update rate. Examples of tier 1 mobile participants include, but are not limited to, mobile phones, laptop computers, tablet computers, wearable computing devices, or other smaller, low power, low transmission mobile computing or Internet-Of-Things devices. In the example illustrated in FIG. 1A, there is only a single tier 1 mobile participant 22, which happens to be a mobile phone in this example. However, other numbers and types of tier 1 mobile participants may also be employed.

Tier 2 mobile participants typically have medium power constraints, a medium amount of processing power, medium bandwidth, medium range capabilities, medium accuracy, and medium update rate. Examples of tier 2 mobile participants include, but are not limited to, automobiles, small personal boats, personal aircrafts, or other medium power, medium transmission, power regenerating mobile computing devices or objects that can support such mobile computing devices. FIG. 1A illustrates example tier 2 mobile participants as including automobiles 24a and 24b. However, other numbers and types of tier 2 mobile participants may also be employed.

Tier 3 mobile participants typically have the largest available power, highest processing power, highest bandwidth, longest transmit and receive capabilities, highest accuracy, and fastest update rate among mobile participant computing devices. Example tier 3 mobile participants include, but are not limited to, commercial airline planes, semi-trucks, cargo ships, trains, or other objects that can support larger, high power, high transmission mobile computing devices or objects that can support such mobile computing devices. FIG. 1A illustrates example tier 3 mobile participants as including boat 26a, train 26b, and airplanes 26c and 26d. However, other numbers and types of tier 3 mobile participants may also be employed.

Various embodiments described herein refer to mobile aerial participants or mobile ground participants. Mobile aerial participants and mobile ground participants are mobile participants. Thus, mobile aerial participants and mobile ground participants may likewise be separated into the three-tiers of participant capabilities.

For example, tier 1 mobile aerial participants may include personal computing devices that are onboard an airplane, such as user devices; tier 2 mobile aerial participants may include general aviation aircraft; and tier 3 mobile aerial participants may include cargo aircraft and commercial aircraft. Tier 1 mobile ground participants may include personal computing devices that are on a person walking down the street or on a car or in a boat; tier 2 mobile ground participants may include automobiles or recreational watercraft; and tier 3 mobile ground participants may include semi-trucks and cargo ships.

In some embodiments, one or more of these tiers may be further separated by capabilities or expected utilization. For example, tier 3 mobile aerial participants may include tier 3A mobile aerial participants that include cargo aircraft and tier 3B mobile aerial participants that include commercial aircraft. One situation where this distinction may occur is where a commercial aircraft is handling a lot of data requests from user devices onboard the aircraft (e.g., tier 1 mobile aerial participants), which may impact that aircraft's throughput for forwarding communications between other participants. Conversely, a cargo aircraft is typically not handling a lot of data request from user devices onboard the aircraft, but is instead primarily being used to forward communications between other participants.

Although some embodiments may be described herein with respect to mobile aerial participants, embodiments are not so limited. Those same embodiments may instead utilize mobile ground participants or a combination of mobile ground participants and mobile aerial participants, unless the context clearly indicates otherwise.

The plurality of stationary participants includes ground entry points 14, remote entry points 16, and access nodes 18.

In some embodiments, stationary participants may be referred to as ground participants. Similar to the three tiers of mobile participants, the ground entry points 14, remote entry points 16, and access nodes 18 are generally separated by computing and networking capabilities, and footprint size in some embodiments.

For example, ground entry points 14 typically have the largest available power, highest processing power, highest bandwidth, and longest range antenna capabilities. Example locations of ground entry points 14 include, but are not limited to, cellular towers, airports, large retail or superstores, or other locations that can support large sized, high power, high transmission stationary computing devices. FIG. 1A illustrates example ground entry points 14 as including tower antenna 14a and superstore 14b. However, other numbers and types of ground entry points 14 may also be employed.

Remote entry points 16 typically have medium power constraints, a medium amount of processing power, medium bandwidth, and medium range capabilities. Example locations of remote entry points 16 include, but are not limited to, restaurants and coffee shops, airfields and train stations, satellites, or other locations that can support medium sized, medium power, medium transmission stationary computing devices. FIG. 1A illustrates example remote entry points 16 as including store antenna 16a and satellite 16b. However, other numbers and types of remote entry points 16 may also be employed.

Access nodes 18 typically have the smallest available power, lowest processing power, lowest bandwidth, and shortest range antenna capabilities of the stationary participants. Example locations of access nodes 18 include, but are not limited to, road intersections, train crossings, road signs, mile markers, crosswalks, or other locations that can support smaller, low power, low transmission stationary computing devices. In the example illustrated in FIG. 1A, there is only a single access node 18, which happens to be a road sign in this example. However, other numbers and types of access nodes 18 may also be employed.

As described in greater detail below, the mobile and stationary participants communicate with one another to pass information from one participant to another, which is further illustrated in FIG. 1B.

Environment 50B in FIG. 1B provides additional details regarding environment 50A in FIG. 1A, and likewise includes a plurality of mobile participants, a plurality of stationary participants, and a plurality of non-participants. Participants can communicate with other participants or with non-participants by forwarding communications between participants. Each participant utilizes a locally stored participant table to determine a next participant in which to send communications along an optimum route between the sending participant and the destination device, which is described in more detail below.

Briefly, however, in this example, participant airplane 26c is attempting to communicate with participant train 26b. If participant airplane 26c is within line-of-sight of train 26b, then the two participants could communicate directly with one another. But if airplane 26c cannot directly communicate with train 26b, then airplane 26c will communicate with train 26b via other participants.

Airplane 26c utilizes a participant table to identify one or more routes from airplane 26c to train 26b via zero, one, or a plurality of other participants. Creation and update of the participant table is discussed in more detail below.

In some embodiments, each participant that forwards a communication message may modify the additional route information to remove route information for previous participants along the route, which allows subsequent participants to transmit less and less data for each hop along the route. In other embodiments, the additional route information is maintained so that the destination participant knows the route of the messages and can reuse the same route to transmit return messages to the originally sending participant, or the destination can recalculate a new route.

In some embodiments, a participant along the route may determine that it should re-calculate a route from that participant to the destination participant. In one embodiment, this determination may be based on the participant not being able to transmit messages to the next participant identified in the additional route information included with the messages, such as if the participant and the identified next participant are no longer in line-of-sight communication with one another. In another embodiment, the participant may re-calculate the route if the connection between the participant and the next participant has significantly deteriorated, e.g., the individual score between that corresponding participant pair has exceeded a threshold value. In one example, the individual score may change based on a system limitation of the participant or the next participant, such as if Doppler effects between the participant and the next participant exceeds a threshold value based on the antenna capabilities of the participant and the next participant. For the illustrated example, tower 14a may perform similar actions as airplane 26c by using the participant table to determine a next participant in which to forward the messages destined to train 26b.

In these examples, the communication links 25, 27, 29, and 31 are line-of-sight communication transmissions from one participant computing device to another. As described elsewhere herein, these transmissions may be non-directional transmissions or they may be directional transmissions.

Even though FIGS. 1A and 1B are illustrated with stationary participants, the line-of-sight communications described herein enables mobile participants to communicate with one another without having to be in line-of-sight communication of a stationary participant, which reduces the need for a complex stationary infrastructure. Moreover, embodiments described herein enable mobile participants to communicate with one another even if the stationary participants become unavailable or if wired communication networks between stationary participants become interrupted. Moreover, the stationary participants can communicate with other participants without the need for specialty hardware for different cellular carriers or networks, rather it can rely on common line-of-sight wireless protocols, such as Wi-Fi technology under the IEEE 802.11 standards, as well as ad hoc protocols now known or developed in the future.

Figure 3:
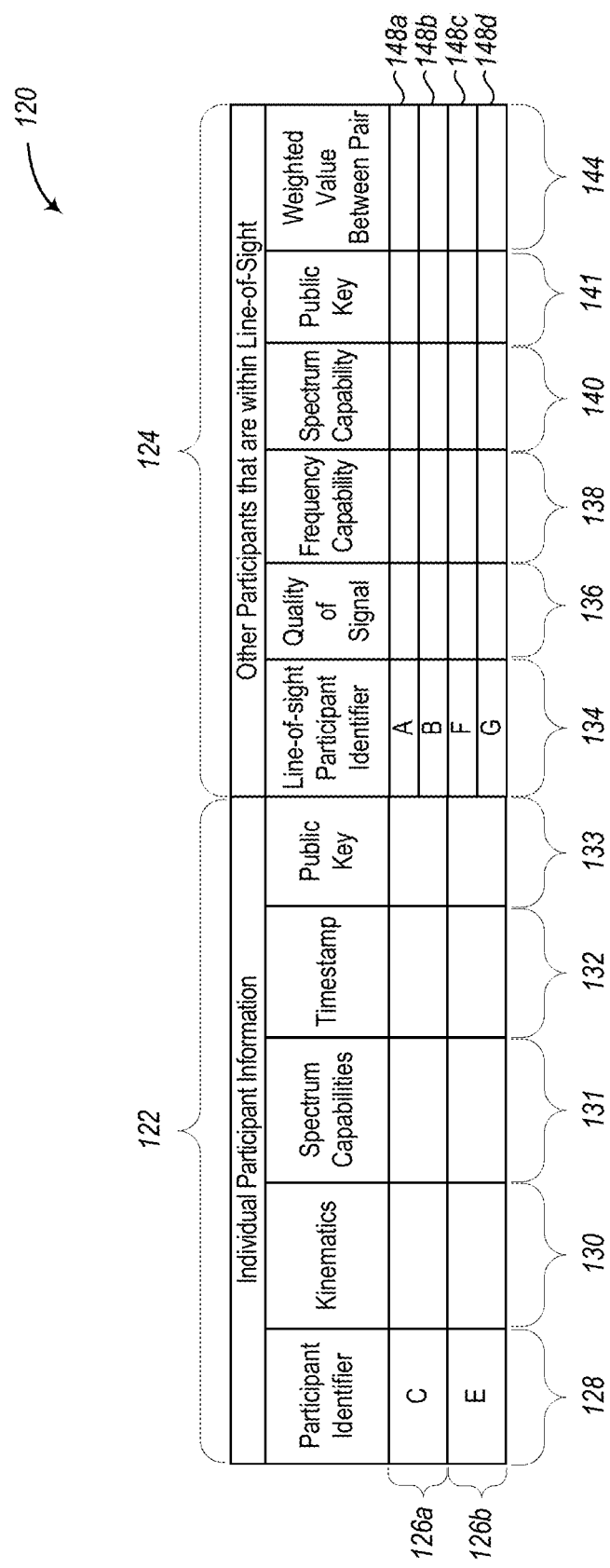
FIG. 3 illustrates an example participant table 120 that tracks participants in the cognitive heterogeneous ad hoc mesh network in accordance with embodiments described herein.

As mentioned above, each participant can select another participant through which it can forward communication messages based on a participant table. The participant table identifies each participant, where each participant is located, how each participant is moving, which participants are within line-of-sight of each other, and various different characteristics or communication capabilities between line-of-sight participants. Creating, updating, and using the participant table is described below, and one example participant table is illustrated in FIG. 3.

The overarching ad hoc mesh network created by the mobile and stationary participants described above in conjunction with FIGS. 1A-1B provides a backbone for a multi-layered network that enables one participant to communicate with another participant, while also providing safety measures to avoid collisions among participants and non-participants.

Figure 2A:
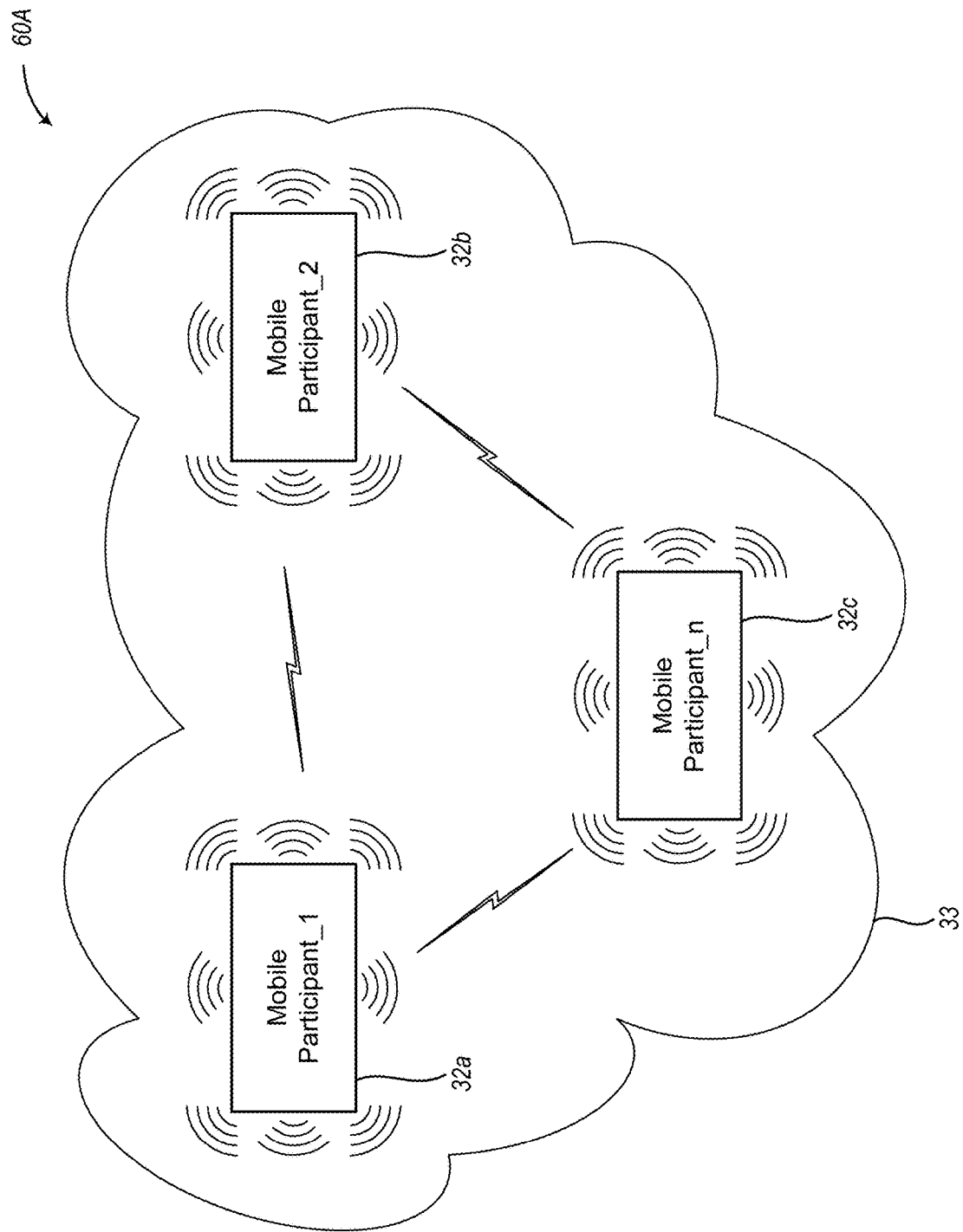
FIGS. 2A-2B illustrate block diagrams of the different layers of the ad hoc mesh network in accordance with embodiments described herein.
Figure 2B:
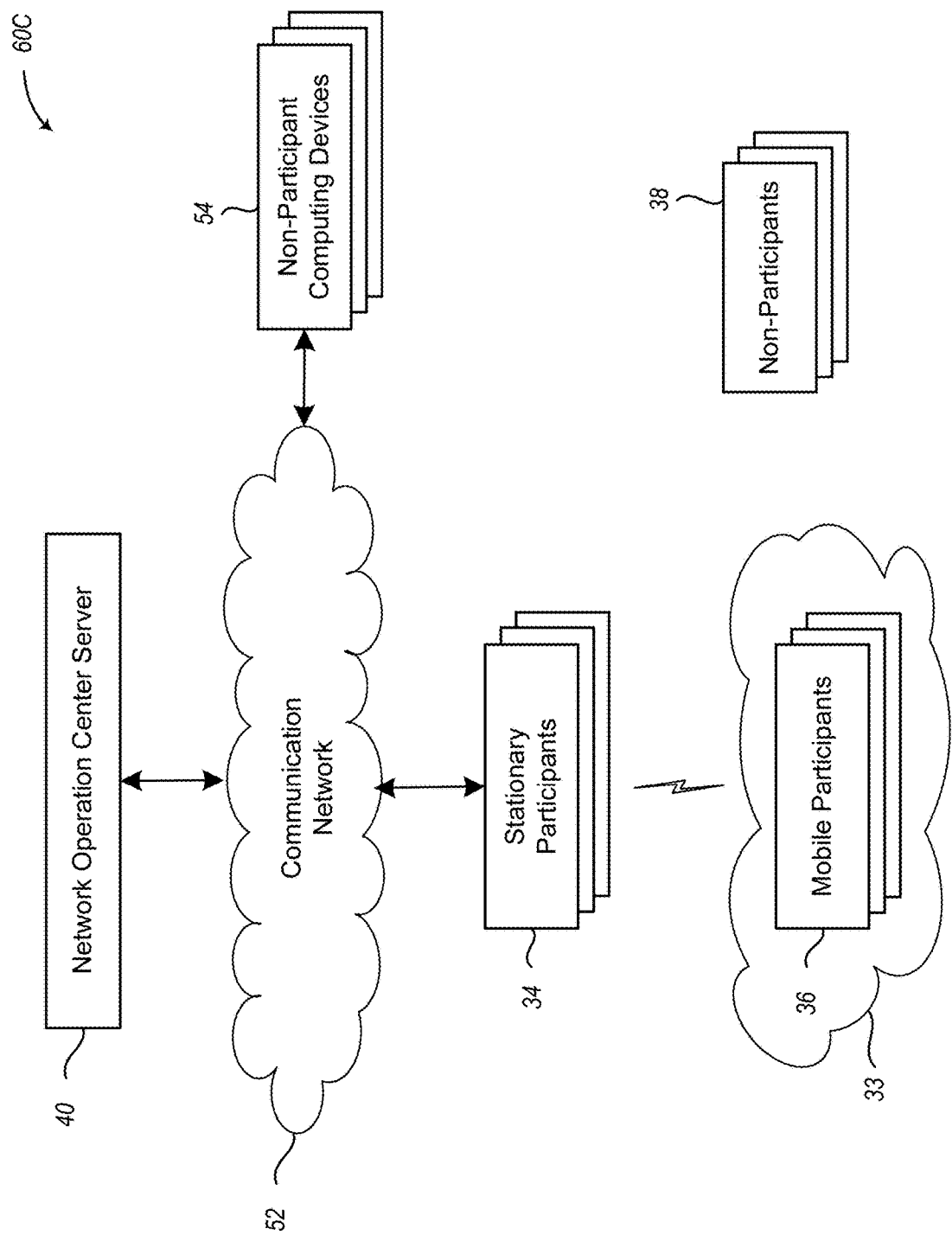

FIGS. 2A-2B illustrate block diagrams of the different layers of the ad hoc mesh network in accordance with embodiments described herein. FIG. 2A illustrates an example 60A of a communications network 33 between a plurality of mobile participants 32a-32c. Although FIG. 2A only illustrates three mobile participants as creating network 33, embodiments are not so limited and one or a plurality of mobile participants may be employed. Similarly, the network 33 may be established from other types of mobile participants, including various combinations of tier 1 mobile participants, tier 2 mobile participants, or tier 3 mobile participants, which perform many of the same functions as the mobile participants.

Each mobile participant 32a-32c transmits radio frequency signals to be received by other mobile participants 32 that are within line-of-sight of the sending mobile participant 32. These signals include, but are not limited to (1) data signals that transmit messages or data to another participant and (2) notification signals that provide personalized information regarding the sending mobile participant. In some embodiments, the notification signals are referred to as self-reporting messages or self-reporting signals. The notification signals can include one or both of notification signals for networking and routing among participants and notification signals for safety and de-confliction of possible threats.

The notification signals serve three primary simultaneous purposes: (1) to notify other participants of the sending participant's identity, position, and kinematic information; (2) to detect and track non-participant objects; and (3) to establish routing and network efficiencies (i.e., to create the participant table described herein). In various embodiments, the notification signals provide individualized information regarding the sending mobile participant 32 so that other mobile participants 32 know that they are within line-of-sight communication of the sending mobile participant 32 within network 33. In some embodiments, the notification signals may include an indication that that participant is acting as an authority, and it may indicate the type or types of authority that it is operating as. As mentioned above, these notification signals may be referred to as self-reporting signals, since the mobile participant 32 is independently reporting its position and kinematic information to any other mobile participants 32 that are within line-of-sight of the transmitting mobile participant 32 without being prompted or requested by another mobile (or stationary) participant. The mobile participants 32 utilize the notification signals to generate a participant table that is utilized to transmit data signals between the mobile participants 32.

In various embodiments, the information in the notification signal includes the mobile participant's 32 identification information, geolocation, kinematic information, throughput capabilities, frequency capabilities, and other information. In various embodiments, the notification signals also include transmission time information that allows for Time Distance of Arrival (TDOA) and Time of Flight (TOF) or Round Trip Timing (RTT) calculations.

The geolocation of the mobile participant 32 may be determined via traditional methods like GPS sensors or modules, cell tower or stationary participant signal triangulation, or via notification messages from other devices or participants that know or estimate the position or location of the mobile participant 32. This can be accomplished with extreme accuracy and minimal latency when notification messages are echoed and supported by stationary participants. The geolocation may also be referred to as the position or location of the mobile participant 32.

The kinematic information may be obtained by monitoring the mobile participant's 32 position and identifying changes over time, utilizing various sensors to calculate or determine the kinematic information, or obtaining it from another system.

The frequency capabilities of the mobile participant 32 may be predetermined based on the type of hardware utilized by the mobile participant 32. For example, the hardware of the mobile participant 32 may be designed to utilize ACARS, IEEE 802.11 standards, or some other wireless transmission frequencies or standards, which defines the frequency capabilities of the mobile participant 32. In other embodiments, the frequency capabilities may be predetermined based on government regulations regarding available frequencies. In yet other embodiments, the frequency capabilities may be defined by a user or administrator.

The throughput may be predetermined based on the type of hardware utilized by the mobile participant 32 or on the current processing capacity or network traffic of the mobile participant 32 or a number of other factors. For example, if the mobile participant 32 is a Boeing 737-700 then it may have more throughput capabilities than a Boeing 777-200ER because the Boeing 737-700 may have less passengers and thus may be supporting fewer data requests from user device onboard the airplane, which can allow for more possessing power to be directed towards forwarding communications between other participants.

In some embodiments, notification signals are transmitted via directional broadcast beams. In other embodiments, the notification signals may be transmitted using non-directional broadcast signals. In general, the use of the term "broadcast" herein refers to the transmission of a signal by a sending participant without being requested by another participant and does not have a specific participant as a destination. In various embodiments, directional notification signals may be transmitted in a sequential or non-sequential 360-degree pattern, so that the notification signal is transmitting in all directions surrounding the participant.

Use of directional transmissions can reduce the amount of power needed to transmit the notification signal or other communication to another participant. Moreover, the use of directional transmissions enables the sending participant to use just enough power to ensure it gets to its intended target. The participant table described herein enables the participants to calculate the required transmit power for transmission without wasting extra power on an overly powerful transmission. Additionally, directional transmissions can reduce interference between transmissions in a congested space as well as make transmissions more secure.

The notification signal may be broadcast periodically, at predetermined times, dynamically selected based on number and proximity of other mobile participants, or at a given dynamically changing update rate. In some embodiments, the rate at which the mobile participant 32 transmits its notification signal may change based on a combination of the distance, closure velocity, and closing angles between the sending mobile participant 32 and other mobile participants 32 within line-of-sight of the sending mobile participant 32.

As mentioned above, the mobile participants 32a-32c broadcast notification signals to inform other mobile participants 32 of their position and movement. For example, mobile participant 32a broadcasts notification signals with information identifying itself and its respective geolocation and kinematic information without regard to the presence or location of mobile participants 32b or 32c. If mobile participant 32c is within line-of-sight of mobile participant 32a, mobile participant 32c receives the broadcasted notification signals from mobile participant 32a and utilizes the information in the notification signals, and its own location and kinematic information, to identify the position and movement of mobile participant 32a relative to itself.

The mobile participants 32 can utilize the notification signals to track other participants and to create and update the participant table to identify which participants are in network 33, their location, their capabilities, and who they are in line-of-sight communication.

As mentioned above, the notification signals are utilized to generate and maintain a participant table so that the mobile participants 32 can transmit messages or data to one another within network 33. For example, the participant table is utilized to determine a recipient participant. The sending mobile participant 32 then transmits a data signal destined for a target mobile participant 32. The data signals are used to transmit the desired messages or data to other participants, which is described in more detail below in conjunction with FIG. 2B. Briefly, the various communications between the mobile participants 32a-32c creates a communication network 33 among each other that enable them to communicate with one another without the use of another communication backbone, such as a cellular tower network.

Similar to the notification signals, the data signals may be transmitted via directional transmission beams or non-directional transmission signals. In various embodiments, the sending mobile participant 32 utilizes the participant table to determine a location of the recipient participant. The sending mobile participant 32 can directionally focus the transmitted data signals towards the recipient participant based on the position of the sending participant and the position of the recipient participant. The use of directional transmissions can reduce power consumption and increase the range in which transmission can be received, while also reducing interference between transmissions in a congested space.

Although not illustrated, other mobile participants and stationary participants may also perform similar actions as described above to identify and track mobile participants that are in line-of-sight to support management of the participant table and to communicate data or information amongst themselves to increase accuracy and efficiency of each participant.

The messages or information contained in the data transmissions may have originated by the sending participant or it may have originated by another computing device and is now being forwarded by the sending participant. In some embodiments, the data may originate at one participant and be destined for another participant. In other embodiments, the data may originate at a non-participant computing device (e.g., content servers, web servers, remote networks, etc.) and be destined for a participant. In yet other embodiments, the data may originate at one participant and be destined for a non-participant computing device.

If the sending participant is within line-of-sight to a destination participant, then the originating participant sends the message or data directly to the destination participant. But if the sending participant is not within line-of-sight to the destination computing device, then the sending participant transmits the message or data to another participant who can continue to forward the message or data toward the destination computing device, which may include one or more "hops" between mobile or stationary participants.

In some embodiments, the data signals may be transmitted whenever the participant has data to be sent and has bandwidth or computing power to transmit the data. In other embodiments, the data may be buffered for a period of time until it can be successfully transmitted from the sending participant to another mobile or stationary participant.

In various embodiments, the participants may use one of various different frequencies to transmit data signals to other participants. In some embodiments, participants scan the entire spectrum or spectrums they are physically able, and legally allowed, to transmit within. Each participant determines based on real-time and historical data what frequencies are available and the length of transmission that can be transmitted without interference on each frequency, as well as what transmitters are available on the participant. In some embodiments, the participants may utilize Dynamic Spectrum Access (DSA) to use multiple frequencies for a single transmission to make full use of the available spectrum. Participants can "sniff" the spectrum and identify free space to use and make such information available to other participants via the participant table. For example, if an airplane is in a thunderstorm it can identify and avoid those frequencies that are unusable for use in unstable whether, and it knows what participants are within range and what frequencies they have available to retransmit to a stationary participant, if required. From this information in the participant table, the aircraft can choose the appropriate frequency/frequencies to transmit on to obtain the highest data-rate while maintaining a signal to noise ratio that ensures data packet reception.

In various embodiments, each participant determines a Quality of Service (QOS) and Signal to Noise Ratio (SNR) between it and each other participant in line-of-sight of that participant, as well as available frequencies to the receiving participant. The participant then assesses the data it needs to transfer and chooses the most efficient frequency with a high QOS and SNR on which to transmit. Moreover, participants may utilize additional information to select what frequencies to transmit data. For example, if a participant is in a thunderstorm, it selects frequencies that are more suitable for use in inclement weather.

The participant can cross reference the throughput and frequency abilities of the other participants, via the participant table, to determine the path and frequency on which to send the data. Once that is determined, the participant can route the data and amplify the signal based on the frequency, distance or latency to the chosen participant, and any known interference values it may have.

In some embodiments, each participant utilizes protocols to establish transmit priorities based on the participant's role at any given moment. For example, an aircraft prioritizes safety of flight information first, then ATC communications, navigation, identification, headquarter communication, then Internet/entertainment connectivity. A cell phone, depending on environment, may act in different ways. For example, at home, it may prioritize Wi-Fi frequencies and prioritize voice communications, then text, then Internet, then email. However, when the cell phone is in a car traveling down the road, the cell phone can use its gyrometers and accelerometers to detect that you are in a vehicle and set the priorities for V2X (vehicle to vehicle/Infrastructure/Pedestrians/other transportation) above voice, text and Internet data exchanges. In contrast, if the cell phone is in a bus or train it may not transmit V2X information.

As mentioned above with respect to FIG. 2A, the multi-layered network allows each participant to track other participants that are local or proximal to the participant, while also tracking transmitted data among participants. The multi-layered network also includes a top layer that provides global tracking of participants and non-participants, and data communication with non-participant computing devices, which is illustrated in FIG. 2B.

FIG. 2B illustrates a block diagram of the highest layer of the multi-layered network. Example 60C in FIG. 2B includes mobile participants 36, stationary participants 34, and network operation center server 40.

Mobile participants 36 and stationary participants 34 employ embodiments described herein to transmit notification signals to generate a participant table to track participants, their location, and the communication characteristics between line-of-sight participants. In various embodiments each stationary participant 34 stores a complete copy of the participant table. When a stationary participant 34 receives an update to the participant table from a mobile participant 36, the stationary participant 34 transmits the update to the other stationary participants 34. The stationary participants 34 also transmit, upon receipt of an update or at predetermined times, the total participant table or only a portion thereof to the mobile participants 36 that are in line-of-sight communication of that corresponding stationary participant 34, which can then be forwarded by the mobile participants 36 to other non-line-of-sight mobile participants 36.

In some other embodiments, the stationary participants 34 may maintain or store a portion, but not all, of the total participant table. For example, each stationary participant 34 stores the portion of the participant table for mobile participants 36 that are within a predetermined distance or number of hops away from the corresponding stationary participant 34. In at least one such embodiment, the stationary participants 34 may provide updates to the network operation center server 40 via communication network 52, which can then distribute the update, i.e., only the update, the total participant table, or a portion of the participant table, to other stationary participants 34. In some embodiments, the network operation center server 40 or the stationary participants 34 can add additional information to the participant table, such as the location of non-participants, which may be obtained from FAA reports, weather radar, local tracking by the mobile participants 36 or the stationary participants 34, or other sources.

As discussed herein, mobile participants 36 utilize the participant table to transmit or forward data or data requests to other mobile participants 36 or to non-participant computing devices 54. Accordingly, the mobile participants 36 communicate with stationary participants 34 (either via line-of-sight communications or via one or more other mobile participants 36) to send and receive data to and from the non-participant computing devices 54 via communication network 52.

The communication network 52 may be any wired or wireless communication network that facilitates the transmission of information from stationary participants 34 to network operation center server 40. In some embodiments, communication network 52 may be the Internet.

In various embodiments, the mobile participants 36 may also provide additional information to the stationary participants 34 and to the network operation center server 40. For example, in some embodiments, the mobile participants 36 may utilize echo signals from the notification signals to track non-participant objects 38, which is described in more detail in U.S. patent application Ser. No. 15/892,259, filed Feb. 8, 2018, entitled "Object Tracking Using A Cognitive Heterogeneous Ad Hoc Mesh Network."

FIG. 3 illustrates an example participant table 120 that tracks participants in the cognitive heterogeneous ad hoc mesh network in accordance with embodiments described herein. Participant table 120 includes individual participant information 122 and line-of-sight participant information 124.

The individual participant information 122 separately identifies multiple participants 126a-126b. For each participant 126a-126b, the individual participant information 122 includes an identifier 128 for the corresponding participant 126a-126b, and kinematic information 130 of the corresponding participant 126a-126b which can include location information of the corresponding participant 126a-126b. Spectrum capabilities 131 of the corresponding participant 126a-126b describe the available media types associated with this node. Also included is a timestamp 132 indicating the time at which the information for the corresponding participant 126a-126b was determined or updated, and a public key 133 determined by the participant computing this table 120 for the peer participant 126a-126b. The individual participant information 122 may also include other information, not shown, such as radio or processing capabilities of the corresponding participant, security protocols or encryption information, system limitations, or other information.

The line-of-sight participant information 124 lists those participants that are within line-of-sight communication of participants 126a-126b, which establishes each participant pair in the participant table 120. For example, corresponding line-of-sight participants 148a-148b are in line of sight of participant 126a.

The line-of-sight participant information 124 includes an identifier 134 for each corresponding line-of-sight participant 148a-148d, a quality of signal 136 for the notification signal sent by the corresponding line-of-sight participant 148a-148d that was received by the corresponding participant 126a-126b, frequency capability 138 and spectrum 140 capabilities of each corresponding line-of-sight participant 148a-148d, and a public key 141 determined by the participant computing this table 120 for each of the other line-of-sight participant.

In some embodiments, the line-of-sight participant information 124 also includes a weighted value 144 between each corresponding participant pair. The weighted value 144 is the individual score for that corresponding participant pair, which is based on a weighted combination of the latency in transmissions between the pair participants, movement of the participants relative to one another (e.g., based on the difference between the kinematic information 130 of each participant in the pair), quality of signal 136 between the pair participants, frequency 138 and spectrum 140 capabilities between the pair participants (e.g., based on the spectrum capabilities 131), whether the timestamp 132 is beyond some threshold amount of time in the past, other information, or any combination thereof. Distance may be a factor of latency because a total latency of a transmission is based on a processing time to transmit a communication, a flight time of the transmission (based on the distance between the participants and the speed at which radio waves propagate through the air), and a processing time to receive the communication.

Each of these types of information may be provided an initial score (e.g., if two airplanes are within 200 meters of each other then it may have a better, lower score than two airplanes 2 kilometers apart), which may be based on one or more thresholds or may be actual values. Each type of information is then weighted based on various factors that can impact the communication between the participant pairs. For example, in some situations, quality of signal may be more important and weighted higher than latency, but kinematic information may be more important and weighted higher than quality of signal (e.g., due to the potential data loss issues from Doppler effect or the potential to be out of line-of-sight). Thus, each type of information may be weighted based on its importance relative to the other types of information such that more important information has a higher weight than lower important information.

In at least one embodiment, the individual score between a participant pair may be based on system limitations of one or both of the participants in the participant pair. For example, participant antennas can generally account for some amount of Doppler shift/effects. However, if the participants of a participant pair are traveling towards one another at a high enough rate of speed, then the antennas may not be able to account for the Doppler shift/effects, which may result in a reduction of quality of service, throughput, or dropped information. Such system limitations may impact the individual score, which can result in calculating a route to avoid participant pairs that currently have or may have system limitations. In at least one such embodiment, one or more thresholds may be employed such that as the Doppler shift/effect becomes worse, the individual score also gets worse (e.g., increases).

In some embodiments, system limitations may be included in the participant table or may be deduced from information within the participant table. In other embodiments, some of these system limitations may not be included in the participant table or may change based on movement of the participants, which can result in increased latency or re-routing the communication.

In various embodiments, each corresponding participant 126 updates its locally stored version of the participant table 120. Stationary participants can update the participant table 120 maintained by the stationary participants based on the information contained in the notification signal sent by the participants 126.

While FIG. 3 shows a table whose contents and organization are designed to make it more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

The operation of certain aspects will now be described with respect to FIG. 4. In at least one of various embodiments, process 150 described in conjunction with FIG. 4 may be implemented by or executed on one or more computing devices, such as mobile participants 36 or stationary participants 34.

Figure 4:
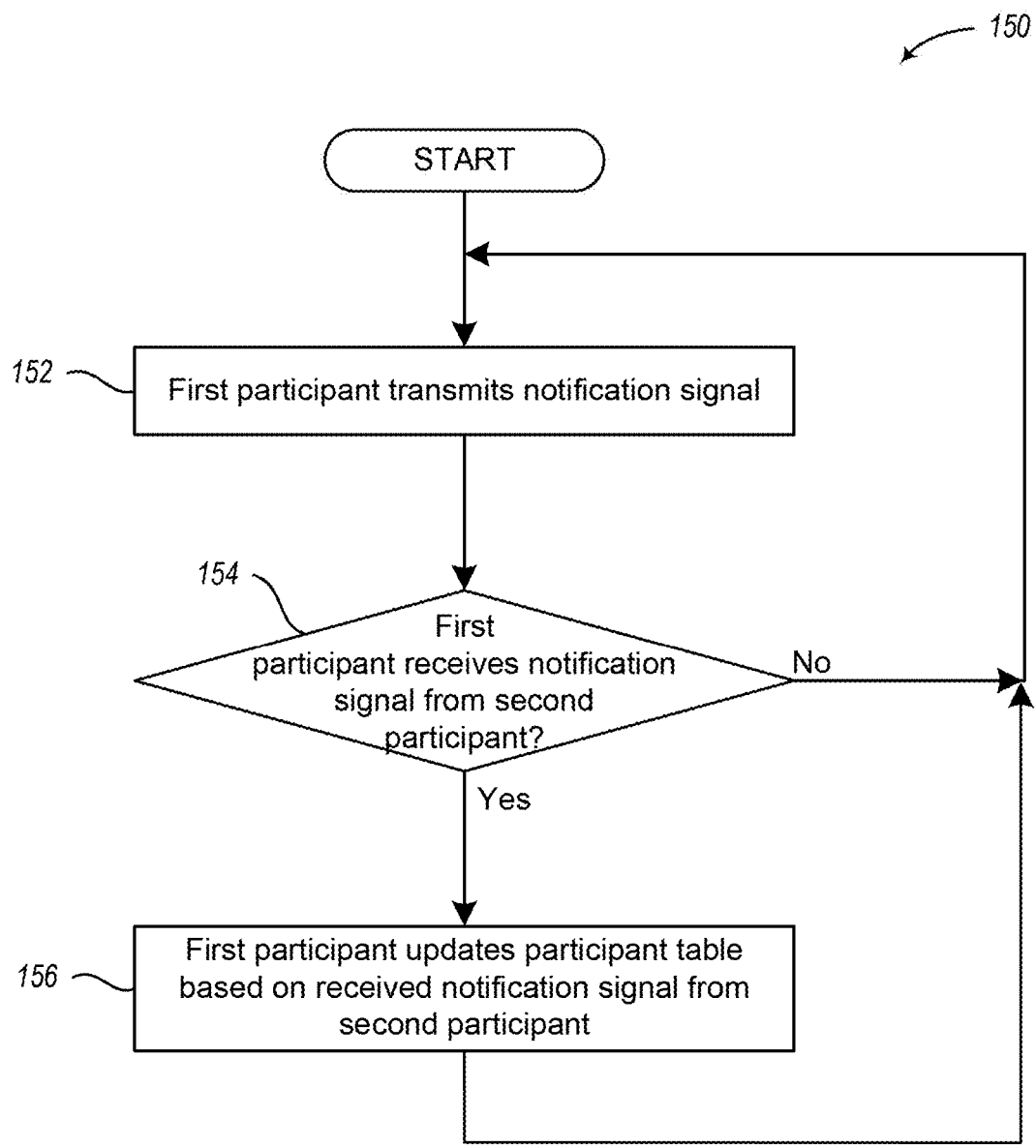
FIG. 4 illustrates a logical flow diagram showing one embodiment of an overview process for a mobile participant to transmit and receive notification signals to manage the participant table of a cognitive heterogeneous ad hoc mesh network in accordance with embodiments described herein.

FIG. 4 illustrates a logical flow diagram showing one embodiment of an overview process for a mobile participant to transmit and receive notification signals to manage the participant table of a cognitive heterogeneous ad hoc mesh network in accordance with embodiments described herein.

Process 150 begins at act 152, where a first mobile participant transmits a notification signal. In various embodiments, the first participant transmits the notification signal at a predetermined rate, periodically, at predetermined times, or based on various operating characteristics of the first participant. The rate at which notification signals are transmitted may be static or dynamic and may change based on the distance and rate of closure between other participants or the number of other participants within line-of-sight of the first participant. Process 150 proceeds to decision act 154, where the first participant receives a notification signal from a second participant. In various embodiments, the first participant may process each notification signal sent by the second participant and received by the first participant. In other embodiments, the first participant may process a subset of the notification signals received from the second participant. If the first participant has received a notification signal from the second participant and the first participant is to process the notification signal, then process 150 flows to act 156; otherwise process 150 returns to act 152 to continue sending its notification signals and waiting for notification signal from other participants.

At act 156, the first participant updates its local version of the participant table based on the information in the received notification signal from the second participant. If the second participant is not in the participant table as being within line-of-sight communication of the first participant, the first participant adds the second participant to the participant table indicating that the first and second participants are within line-of-sight communication of one another, as a participant pair. If the second participant is already listed in the participant table, the first participant updates the participant table with the information from the received notification signal, such as the current location and kinematic information from the second participant. In some embodiments, the first participant updates the participant table to include additional information regarding the communication with the second participant, such as the quality of signal received from the second participant, signal to noise ratio, frequency or spectrum capabilities, etc. After act 156, the first participant continues in act 152.

Those skilled in the art will appreciate that the acts shown in FIG. 4 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 5:
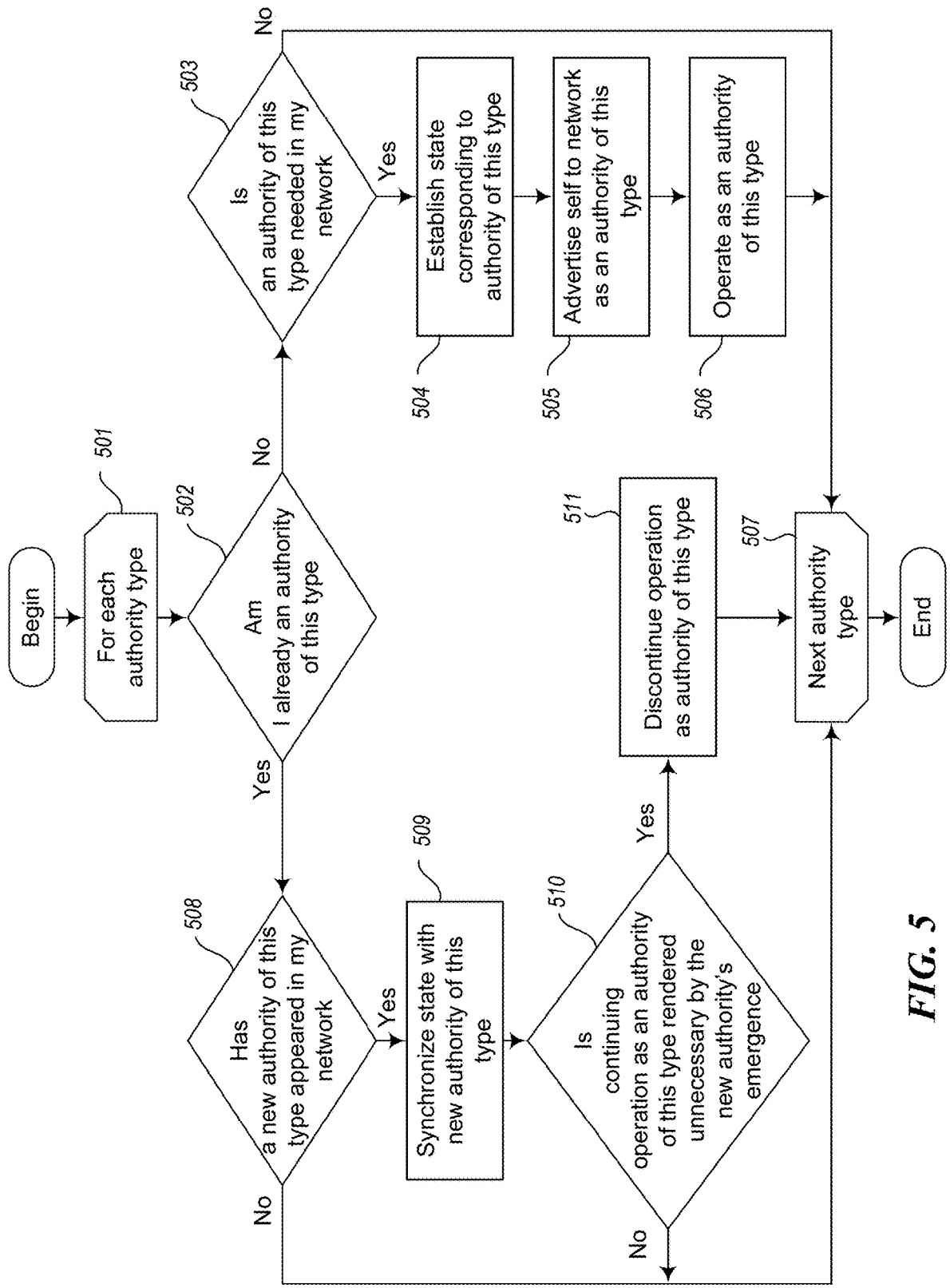
FIG. 5 is a flow diagram showing a process performed by the facility in some embodiments to dynamically spawn, synchronize, and consolidate network authorities that provide network services.

FIG. 5 is a flow diagram showing a process performed by the facility in some embodiments to dynamically spawn, synchronize, and consolidate network authorities that provide network services. In some embodiments, the facility performs this process in some or all of the participants in a network operated by the facility. In some embodiments, the facility performs this process periodically in these participants, such as every 5 milliseconds, every 250 milliseconds, every 500 milliseconds, every second, every five seconds, every 30 seconds, every minute, every five minutes, every ten minutes, every 20 minutes, every 30 minutes, every hour, etc. In other embodiments, the facility performs this process in response to a change in the network, such as if a participant joins or leaves the network.

In acts 501-507, the facility loops through each of one or more authority types for which the participant is equipped to operate as an authority. In various embodiments, these include all of the known authority types, or a proper subset of them. Examples of authority types are identified elsewhere herein. In various embodiments, a particular participant can be qualified to operate as an authority of a particular type based upon its manufacturer, device type, installed hardware devices; and/or their level of utilization; operating system; authority-specific software; software other than operating system relied upon by authority-specific software; state or other data related to the type of authority; present location; connection to other networks; security requirements of the participant; administrative authority; etc.

In act 502, if the participant is already an authority of this type, then the facility continues in act 508, else the facility continues in act 503. The facility can select a given type and determine if it is an authority of the given type based on metadata or information stored or accessible by the facility. In act 503, if an authority of this type is needed in the network, then the facility continues in act 504, else the facility continues in act 507 to process the next authority type. In various embodiments, the facility makes the determination of act 503 based upon whether any authorities of this type are operating in the network, or whether an adequate number of authorities of this type are operating in the network, or whether the authorities of this type operating the network are providing a supply of the service that is adequate in view of demand for the service in the network. In various embodiments, the facility determines demand based on processing capacity, network topology, transmission latency, or other similar characteristics. In some embodiments, rather than proceeding directly to act 504 as shown, the facility conducts an election to determine which node or participant in the network will serve as the needed authority. In some embodiments, conducting this election involves determining a score reflecting the participant's suitability for becoming an authority; broadcasting the score to other participants in the network; observing scores broadcasted by other participants about themselves; and determining whether the participant has a higher score than those broadcast by other participants. In act 504, the facility establishes a state used by authorities of this type. In various embodiments, the state established by the facility in act 504 is based upon fixed state initialization values; information relevant to the authority type that has been accumulated by the participant in the course of its participation in the network; and/or data retrieved from outside the participant contemporaneously with the establishing. Details of authority state for example authority types are described elsewhere herein. In act 505, the facility advertises itself to participants of the network as an authority of this type. In some embodiments, act 505 involves sending a periodic broadcast message containing the participant's node ID and/or other identifying information for the participant, and an indication of the authority type. In some embodiments, this message contains additional information about the participant's performance as an authority of this type; as one example, a participant operating as an echo authority may include information about whether the participant performs this role in a streaming mode or a packet mode to help other participants interpret the result of using this particular echo authority. In act 506, the facility operates as an authority of this type, in some cases accumulating or changing it state to reflect details of its operation as an authority of this type. In act 507, if additional authority types remain to be processed, then the facility continues in act 501 to select and process the next authority type, else this process concludes.

In act 508, where the participant is already an authority of the current type selected at act 501, if a new authority of this type has appeared in the network, the facility continues in act 509, else the facility continues in act 507. In some embodiments, the facility performs act 508 based on monitoring for notification signals or other advertisement messages from other participants indicating that they are operating as authorities of particular types, and caching this information for use in the next iteration of act 508. In act 509, the facility synchronizes the state of the participant established in act 504 for this authority type with the corresponding state of the participant that has newly appeared as an authority of this type. Details of the synchronization process are described elsewhere herein. In various embodiments, the facility synchronizes all of the participant's state for the authority type with the other participant, or only a portion. In various embodiments, the synchronization of act 509 can be bilateral, such that each of the participants involved copies the state of the other, or otherwise reflects it in its own state; or unilateral, where one of the participants shares its state with the other, but does not receive or reflect the other's state. In some embodiments, the facility utilizes unilateral synchronization in situations where it determines that a particular one of the participants should withdraw from serving as an authority of this type.

In act 510, if continuing operation as an authority of this type is rendered unnecessary by the new authority's emergence, then the facility continues in act 511, else the facility continues in act 507. In some embodiments, the facility makes the determination of act 510 based on such factors as an assessment of supply versus demand of the corresponding network service; whether the participant is well-suited to continue as an authority of this type, such as by having an adequate supply of the computing or other resources needed to perform the service, is in a better physical location to provide the service, is in a better work logical location in a graph of the connections that make up the network, etc. In various embodiments, the facility's determination in act 510 is based on or unrelated to changes that occur in the network's topology.

In some embodiments (not shown), in place of act 510, the two authorities engage in a bilateral negotiation about whether either of the participants should withdraw as authorities of this type, and if so, which. In some embodiments, this negotiation includes an assessment of supply versus demand of the corresponding network service; if supply significantly exceeds demand, the facility may determine that one of the participants should withdraw. In some embodiments, this negotiation includes an assessment of whether the network and its participants would be better served by the participant's withdrawal or the other participant's withdrawal; some embodiments, the facility considers in this assessment whether each participant has an adequate supply of the computing resources needed to perform the service; would provide more benefit to the network if the resources used to provide the service were used for another purpose; is in a better physical location to provide the service, or is in a better logical location in a graph of the connections that make up the network; etc. In some embodiments, the facility performs this assessment by conducting an election among the participants. In some embodiments, the facility chooses one of the authorities to withdraw based upon a random determination. In some embodiments, this negotiation involves aspects of the timing of the withdrawal, e.g., whether it is immediate, will occur at a fixed future time, or is contingent on a future event whose time is uncertain. In some embodiments (not shown), where two or more other participants are providing the service in the network, the negotiation is performed with more of them, such as all of them. In some embodiments, the facility causes the node withdrawing from authority status to notify other participants of its withdrawal at a time when it is still processing requests from one or more participants; in some such embodiments, the facility causes the withdrawal of the withdrawing authority to occur at a later time, after these outstanding requests have been processed. In some embodiments, the negotiation results in no participants withdrawing from acting as authorities of this type. In some embodiments, no negotiation or withdrawal is performed. In some embodiments (not shown), the participant may withdraw from serving as an authority of this type in situations where no new authority of the type has appeared; as examples, this may occur when an existing authority of the type becomes better-suited to serve this role, or this participant becomes less well-suited; where demand for the service declines in the network; etc.

In act 511, the facility causes the participant to discontinue operation as an authority of this type. In some embodiments (not shown), the participant may withdraw from serving as an authority of this type in situations where no new authority of the type has appeared; as examples, this may occur when an existing authority of the type becomes better-suited to serve this role, or this participant becomes less well-suited; where demand for the service declines in the network; etc. After act 511, the facility continues in act 507.

Figure 6:
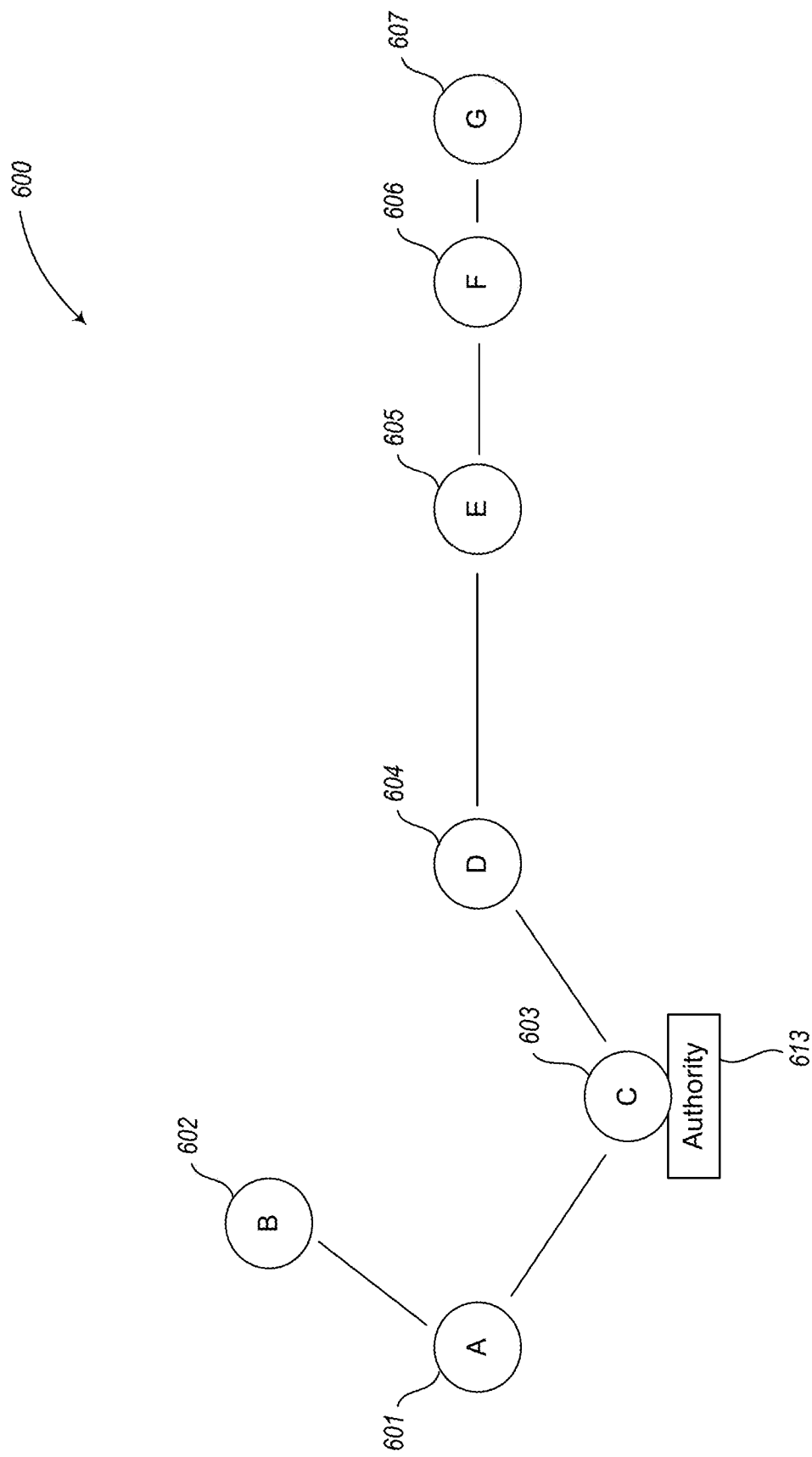
FIG. 6 is a network diagram showing a sample environment in which the facility operates at a first time.
Figure 8:
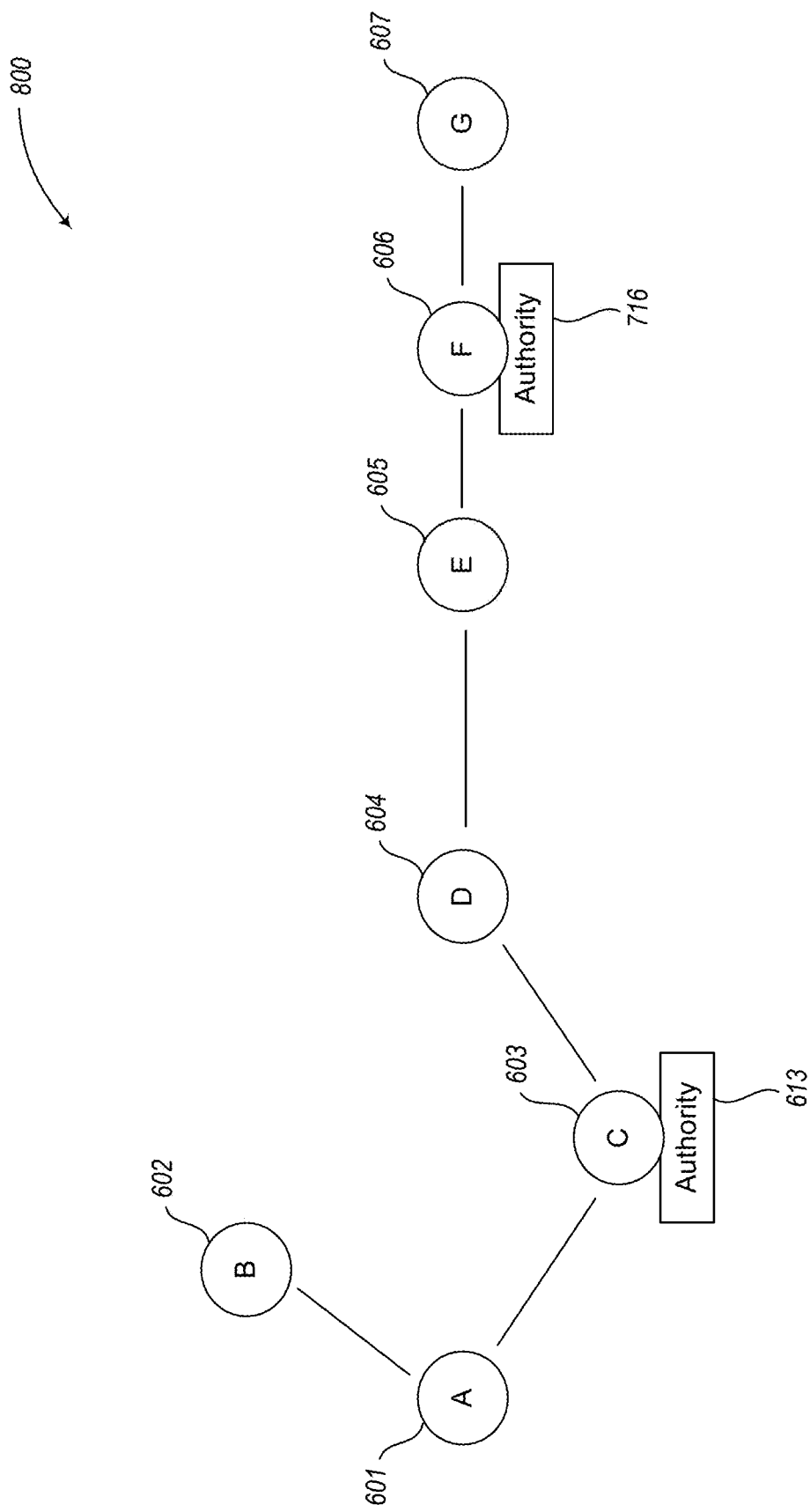
FIG. 8 is a network diagram showing a sample environment in which the facility operates at a second time.

FIGS. 6-8 show an example of the operation of the facility. FIG. 6 is a network diagram 600 showing a sample environment in which the facility operates at a first time. As shown in the diagram 600, the facility has constructed a network having the following connections: node A 601 is connected to nodes B 602 and C 603; node B is connected to node A; node C 603 is connected to node A and node D 604; node D is connected to node C and node E 605; node E is connected to node D and node F 606; node F is connected to node E and node G 607; and node G is connected to node F. Additionally, node C is operating as the only authority 613 for a certain network service.

FIG. 7 is a network diagram 700 showing a sample environment in which the facility operates at a second time relative to the first time shown in FIG. 6. Compared to FIG. 6, the diagram 700 shows that the location of node E has changed, such that node E is still near enough to node F to maintain the connection between nodes E and F, but node E is now too far from node D to maintain the connection between nodes D and E. Accordingly, the facility executing on nodes E, F, and G reorganizes nodes E, F, and G into a new network. When the facility executing on node F next performs the process shown in FIG. 5, it determines that the certain network service that was previously being provided by node C is not being provided in the new network in which node F is now a member, and that an authority of this type is needed by the new network. Accordingly, the facility determines that node F should emerge as an authority 716 of this type. As discussed elsewhere, the facility executing on each of nodes E, F, and G may determine or coordinate that node F is to be the authority 716. While the situation shown in FIG. 7 exists, nodes A, B, C, and D are exclusively served for the certain network service by authority 613 operated by node C, and nodes E, F, and G are exclusively served for the certain network service by authority 716 operated by node F. During this period, these two separate authorities operated by these two separate nodes can develop divergent states based upon their provision of the certain network service in response to requests by the different groups of nodes.

FIG. 8 is a network diagram showing a sample environment in which the facility operates at a third time relative to the second time shown in FIG. 7. Compared to FIG. 7, the diagram 800 shows that the location of node E has changed again, such that node E is able to communicate with both the nodes D and F. Accordingly, the facility merges the two separate networks shown in FIG. 7 back into a single network in which nodes A-G are participants. When the facility executing on node F next performs the process shown in FIG. 5, it determines that a new authority has appeared providing the certain network service. Accordingly, it proceeds to synchronize its authority state with the new authority 613 in node C, such that both authorities are capable of serving all of nodes A-G in the network. The facility further proceeds to negotiate withdrawal of authority status between nodes C and F. For example, the negotiation may conclude that authority status should be withdrawn from node F, reverting to the situation shown in FIG. 6. The negotiation may instead conclude that authority status should be withdrawn from node C, or that demand for the service justifies both nodes expending the resources needed to continue as authorities.

Networks may arise, split, join, add or shed participants, add or shed authorities, etc., in response to various occurrences. These include, for example, node movement or reorientation; changes in a node's stored energy level, mode of operation, or usage pattern; installation or deletion of programs, code, or data, either corresponding to the facility or not corresponding to the facility; changes in weather conditions; etc. In each case, the facility responds dynamically to these occurrences to ensure that each network service is provided at an appropriate level.

More detailed information about various authority types, and relevant state and synchronization, is discussed below.

In some embodiments, the state maintained by a routing authority includes routing information describing connections among the participants in the network that can be used to direct messages to addressee participants, which may be stored in a participant table, a routing table, or a routing data resource of another type. In some embodiments, the facility synchronizes routing authority state between two routing authority nodes by exchanging their routing information. In each routing authority node, the facility merges the received routing information with the routing information native to that node.

In some embodiments, the state maintained by a time authority includes time value; skew, a measure of expected accumulated error in time value; jitter, a measure of variation in skew; and clock stratum, a general measure of clock reliability based at least partly upon a level of indirectness with which the clock is synchronized with an atomic clock time source.

In some embodiments, the facility synchronizes time authority state between two time authority nodes by selecting the node most likely to have the most accurate time value, based on factors including skew, jitter, and stratum. The facility then transfers the time value of the selected authority node to the other authority node, making adjustments for measured transit time between the two nodes. In some embodiments, the facility synchronizes time authority state between two time authority nodes using NTP, the Network Time Protocol. Details of using NTP to perform such synchronization are included in Mills, D. L., Internet time synchronization: the network time protocol, IEEE Transactions on Communications, volume 39, issue 10, pp. 1482-1493, October, 1991, available at ieeexplore.ieee.org/document/103043; Mills, D. L. Computer Network Time Synchronization: the Network Time Protocol. CRC Press, March 2006; Network Time Foundation, What is NTP?, available at support.ntp.org/bin/view/Main/WebHome; and Network Time Protocol Version 4: Protocol and Algorithms Specification, Internet Engineering Task Force Request for Comments 5905, June, 2010, available at www.ietf.org/rfc/rfc5905.txt; each of which is hereby incorporated by reference in its entirety.

In some embodiments, state maintained by a registration authority includes rules about the nodes that may be registered—such as a maximum number of nodes that may be registered, a designated geographic area in which nodes may be registered, constraints on types of hardware or operating system or other software that must be used in nodes to be registered, etc.—as well as information needed to track exhaustion of the registration rules, such as number of nodes registered so far relative to the specified maximum number of nodes. In some embodiments, the facility synchronizes registration authority state between two registration authority nodes by exchanging their registration information. In each of the registration authority nodes, the facility reconciles the exchanged registration information, such as by choosing the more permissive registration rules, or the more restrictive registration rules; and selecting the lower number of registered nodes, the higher number of registered nodes, or a sum of the two numbers of registered nodes. The registration authority may also coordinate the release of security keys to nodes as they join the network. When the facility synchronizes registration authority state between two registration authority nodes, a node having a security key most recently authenticated by the overall system may coordinate the distribution of that security key among all nodes in the combined network.

In some embodiments, echo authorities maintain no state other than the node's status as an echo authority. Where this is true, no action is necessary to synchronize the state of two echo authority nodes. In some embodiments, echo authorities maintain state indicating whether each echoes messages in a streaming or packet mode. In some such embodiments, this aspect of state is not synchronized with other echo authority nodes, which can make its own determination of echo mode.

In some embodiments, the provider of a third-party application specifies the state maintained by third-party application authorities that service their application. For sample, in some embodiments, the provider of a text, voice, or video chat application that relies on an address book of users who are able to use chat to communicate may specify that third-party application authorities for its application maintain a state corresponding to the contents of the address book, such as a table in which each row corresponds to a different chat correspondent and is divided into the columns node ID, username, and chat router ID. To synchronize their state, the provider would specify that two third-party application authorities exchange and merge their address books.

FIGS. 9-17 address the coordinated dynamic emergence, synchronization, and consolidation of registration and security authorities by the facility.

Figure 9:
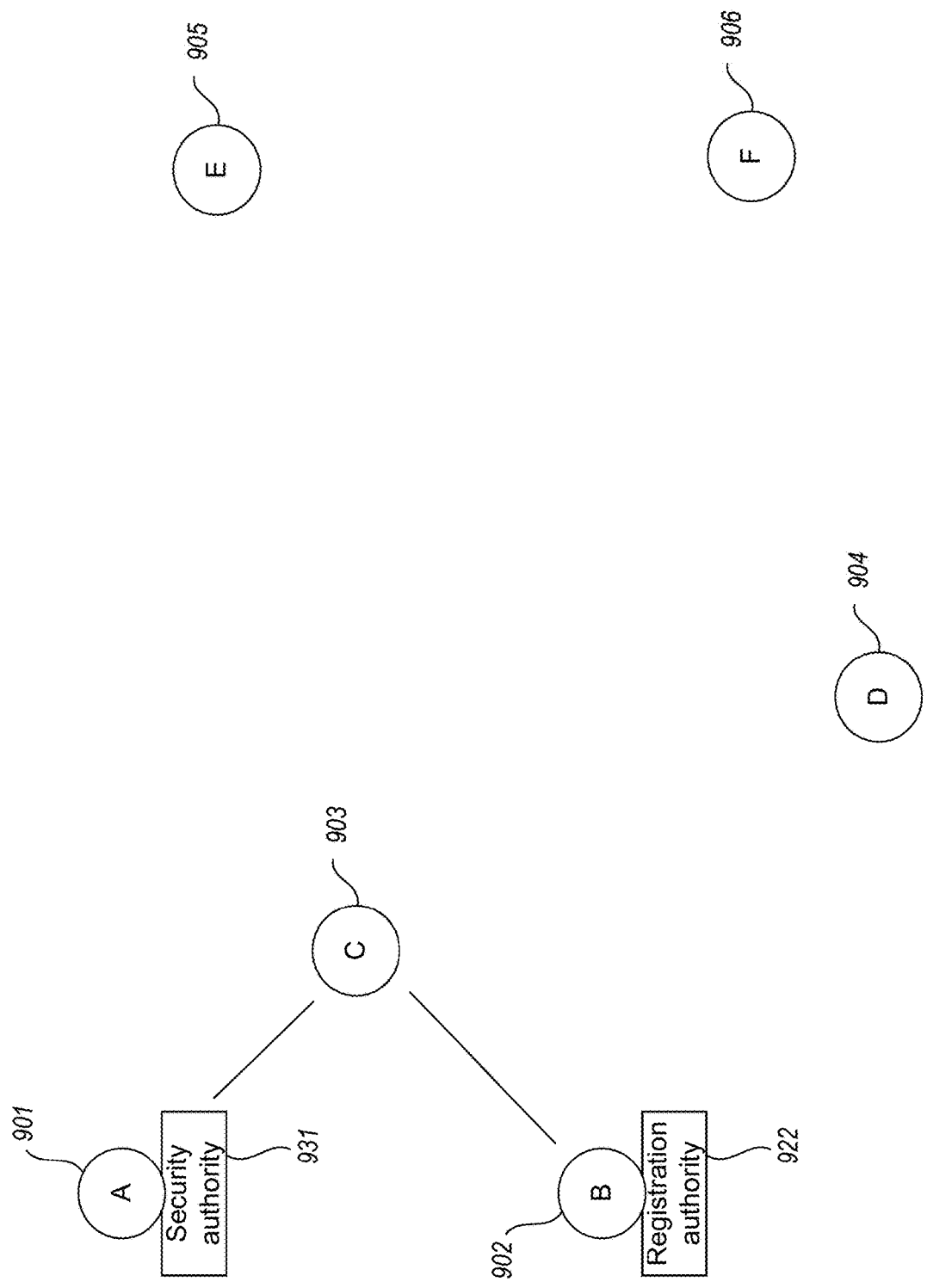
FIG. 9 is a network diagram showing a sample environment in which the facility performs coordinated dynamic emergence, synchronization, and consolidation of registration and security authorities, at a first time.

FIG. 9 is a network diagram showing a sample environment in which the facility performs coordinated dynamic emergence, synchronization, and consolidation of registration and security authorities, at a first time. In the environment shown, the facility has established a network among nodes A 901, B 902, and C 903. This network is identified by a particular network identifier, and is referred to as "network ABC" below. Node A is serving as security authority 931 for this network, while node B is serving as its registration authority 922. In some cases (not shown here), a single node serves as both security authority and registration authority for the network in which it is participating. As a result of earlier activity by the registration authority, all of nodes A-C are registered: (1) they have received device "slots" in the license administered by the registration authority, and have been added to a list maintained by the registration authority of nodes occupying these slots; and (2) they have each received from the registration authority a chain of trust that extends to the node from the trust root, through the registration authority. As a result of earlier activity by the security authority, all of nodes A-C are active in the network: (1) they have received a network key from the security authority that enables them to encrypt and decrypt messages exchanged on the network; and (2) have been added to a list maintained by the security authority of nodes that have received network keys from the security authority. The environment also includes three additional nodes not connected to any network or each other: nodes D 904, E 905, and F 906.

While the network keys provided by the security authority can be used to protect communications among any group of the nodes in a network, in some embodiments, the facility causes certain pairs of nodes each negotiate separate keys specifically to use to protect communication between the nodes of each pair. In some embodiments, these "pairwise keys" are used for communications described herein between two specific nodes. Examples include a node requesting registration of a registration authority, and the registration authority returning a chain of trust; a node requesting a network key of a security authority, and the security authority returning the network key; two registration authorities synchronizing, or updating their synchronization; two security authority synchronizing, or updating their synchronization; etc. Creation and use of these pairwise keys is discussed further in US Pre-grant Patent Publication No. 2023/0096692 of U.S. patent application Ser. No. 17/489,493, entitled "EFFICIENT WIRELESS PUBLIC KEY EXCHANGE," filed on Sep. 29, 2021, which is hereby incorporated by reference in its entirety.

Figure 10:
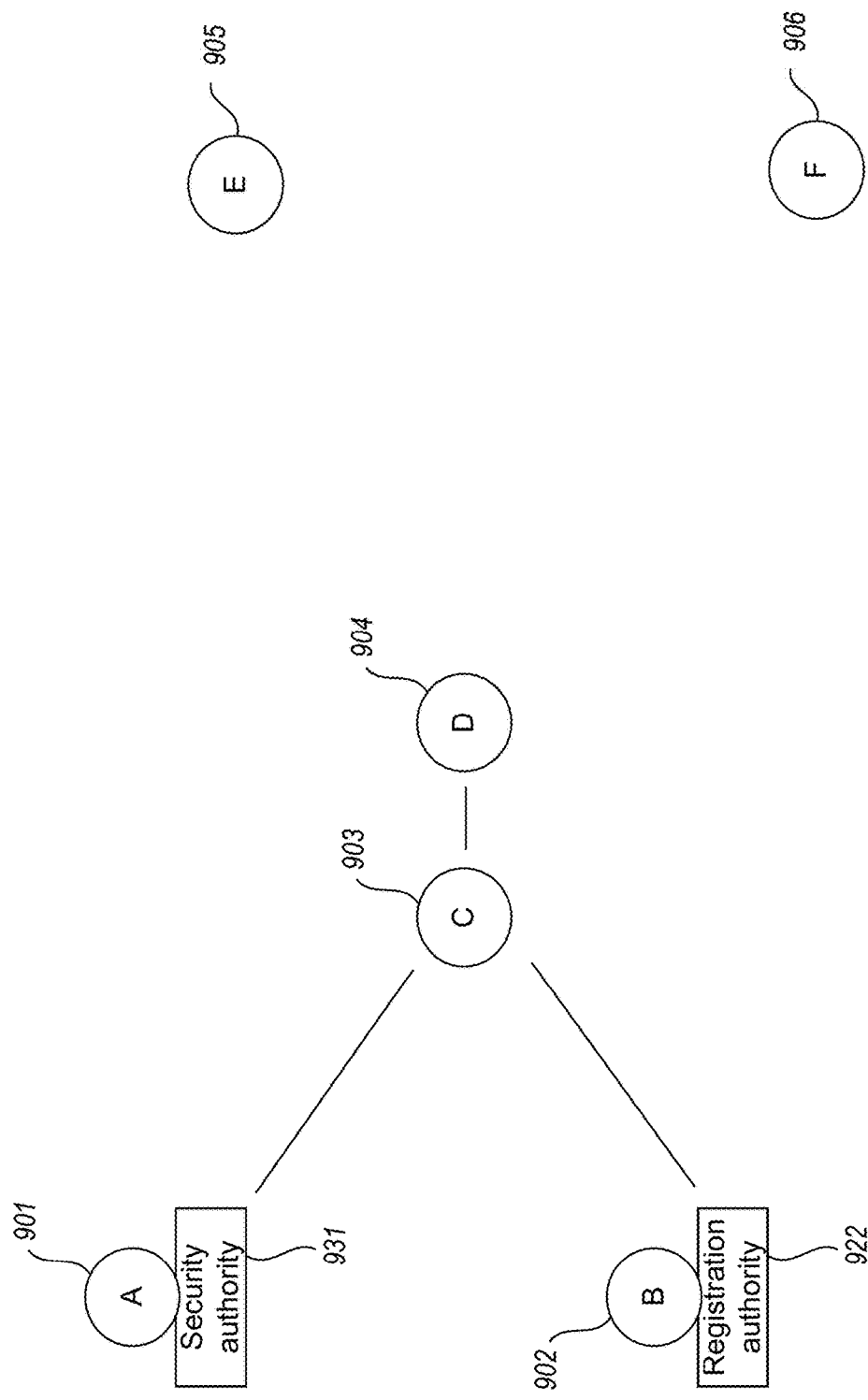
FIG. 10 is a network diagram showing a sample environment in which the facility performs coordinated dynamic emergence, synchronization, and consolidation of registration and security authorities, at a second time later than the first time shown in FIG. 9.

FIG. 10 is a network diagram showing a sample environment in which the facility performs coordinated dynamic emergence, synchronization, and consolidation of registration and security authorities, at a second time later than the first time shown in FIG. 9. By comparing FIG. 10 to FIG. 9, it can be seen that node D has moved into proximity of node C, and in communication and wirelessly connected to node C. A process performed by the facility in response to the connection of node D to one of the nodes of the ABC network is described below in connection with FIG. 11.

Figure 11:
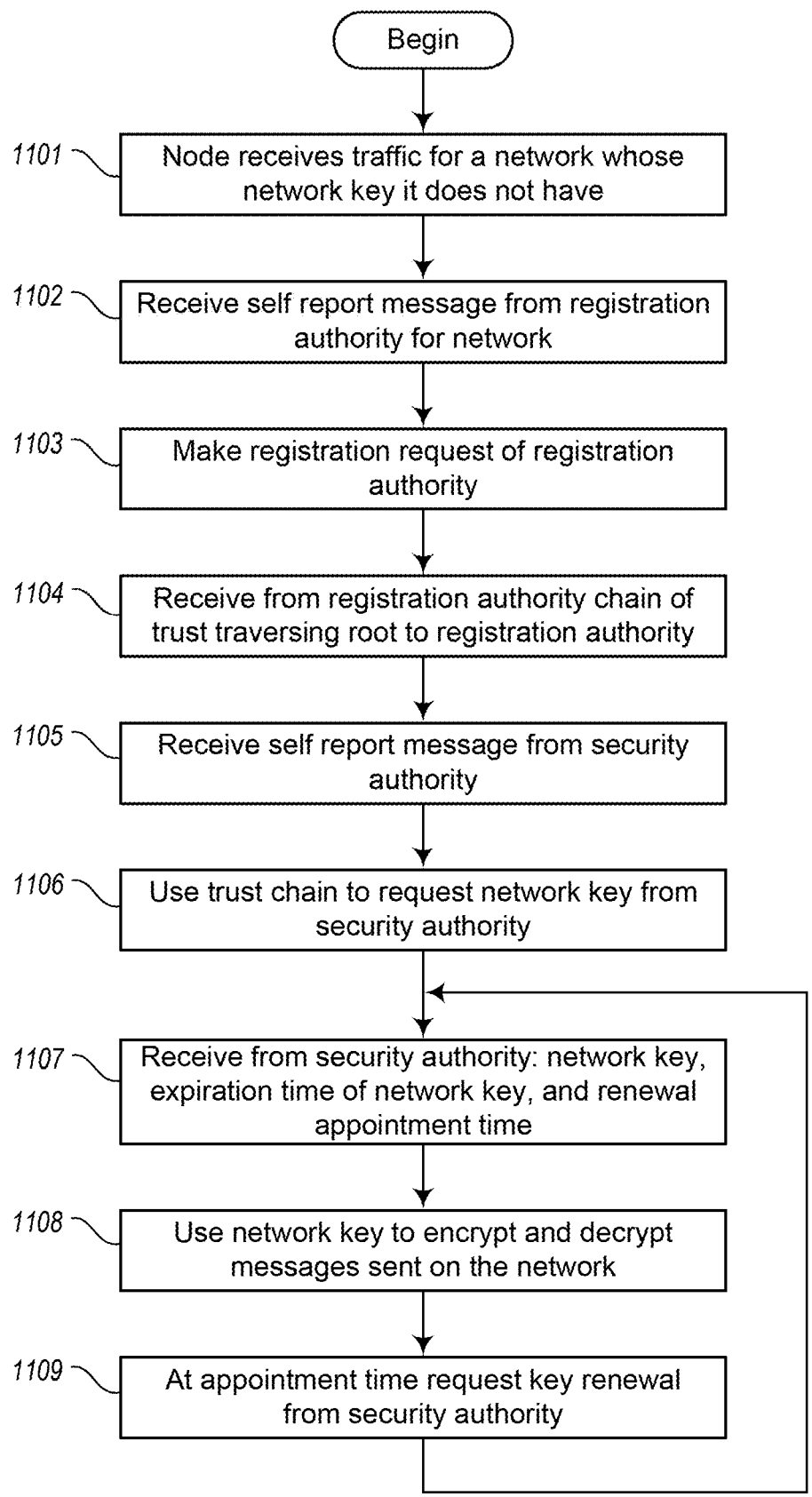
FIG. 11 is a flow diagram showing a process performed by the facility in some embodiments when a new node connects to an existing network.

FIG. 11 is a flow diagram showing a process performed by the facility in some embodiments when a new node connects to an existing network. In some embodiments, the acts shown in FIG. 11 are performed by code of the facility executing on the connecting—or "arriving"—node. In act 1101, the arriving node (node D in the example) receives network traffic for a network whose current network key the arriving node does not possess. In act 1102, the facility receives a self report message from a node of the network that identifies itself as a registration authority for the network. In the example, node D receives the self report message from node B that identifies node B as a registration authority for the network. In some situations, node D may receive the self report message directly from the registration authority node, such as if the nodes are in line-of-sight communications of one another. In this situation, the self report message may be included with a notification signal sent from the registration authority node. In other situations, node D may receive the self report message via one or more other nodes. In the example, node D receives the self report message of node B through node C. In some embodiments, each node in the network may store a copy of the self report message for the registration authority so that each node can provide the self report message to a new node that comes into proximity of the network. In act 1103, the facility in the arriving node makes a registration request of the registration authority. In some embodiments, the registration request includes the arriving node's device identifier. In the example, the facility in node D makes a registration request of node B. This request may be directly between node D and node B if the nodes are within line-of-sight communications or the request may be passed from node D to node B through one or more other nodes. In response to determining that the license that it administers permits the arriving node to be added to the network, the registration authority adds the arriving node to its node list, and sends the arriving node a chain of trust traversing the trust root through the registration authority to the arriving node. In act 1104, the facility in the arriving node receives and stores this chain of trust from the registration authority. In some embodiments, this chain of trust is the node ID identifying the arriving node, signed with a chain of trust that extends from the trust root only to the registration authority. In the example, the facility in node D receives a chain of trust created by node B for node D that constitutes node D's device ID, signed by node B's chain of trust.

In act 1105, the facility receives a self report message from a node of the network that identifies itself as a security authority for the network. In the example, node D receives this self report message from node A. Similar to the self report message from the registration authority node described above, node D may directly or indirectly receive the self report message from the security authority. In some embodiments, each node in the network may store a copy of the self report message for the security authority so that each node can provide the self report message to a new node that comes into proximity of the network. In act 1106, the facility uses the trust chain received in act 1104 to request from the security authority a network key for the network. In the example, node D makes this request of node A. Similar to the request described above, node D may directly or indirectly send the request to the security authority. In response to the security authority verifying that the arriving node's chain of trust is adequate to operate in the network, the security authority adds the arriving node to its node list, and sends the arriving node (1) a network key; (2) an expiration time that applies to the network key; and (3) a renewal appointment time at which the arriving node should contact the security authority to obtain a new network key to use in place of the sent network key. In act 1107, the facility in the arriving node receives the information sent by the security authority. In the example, node D receives this information from node A. In act 1108, the facility in the arriving node (node D in the example) uses the network key received in act 1107 to encrypt messages sent by the arriving node on the network, and decrypt messages received by the arriving node on the network. In some embodiments, the facility uses network keys to secure network communications in one or more of the ways described in U.S. patent application Ser. No. 16/858,473, entitled "SEAMLESS CONNECTIVITY UTILIZING MULTI-DOMAIN SECURITY," filed on Apr. 24, 2020, which is hereby incorporated by reference in its entirety.

In act 1109, at the appointment time received in act 1107, the facility in the arriving node requests key renewal from the security authority. In the example, node D makes this request of node A. After act 1109, the facility continues in act 1107 to receive a new network key, expiration time, and renewal appointment time sent by the security authority in response to the key renewal request. By adding node D, the facility has expanded network ABC to be network ABCD.

Figure 12:
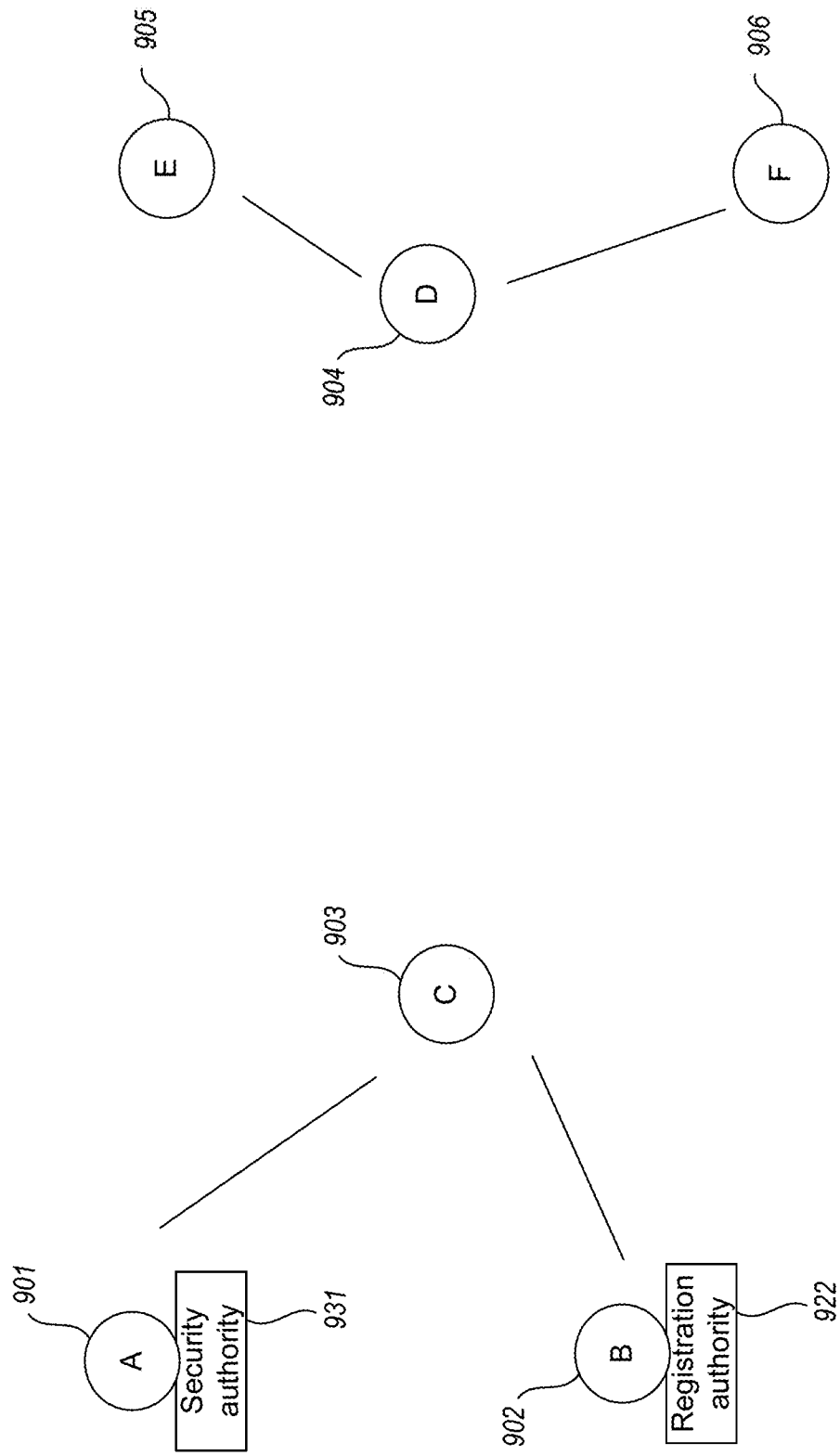
FIG. 12 is a network diagram showing a sample environment in which the facility performs coordinated dynamic emergence, synchronization, and consolidation of registration and security authorities, at a third time later than the second time shown in FIG. 10.

FIG. 12 is a network diagram showing a sample environment in which the facility performs coordinated dynamic emergence, synchronization, and consolidation of registration and security authorities, at a third time later than the second time shown in FIG. 10. By comparing FIG. 12 to FIG. 10, it can be seen that node D has moved away from node C, into proximity of nodes E and F, such that node D is no longer connected to node C or any other node of network ABCD, and node D is now connected to nodes E and F. A process performed by the facility in response to the connection of node D to nodes E and F is described below in connection with FIG. 13.

Figure 13:
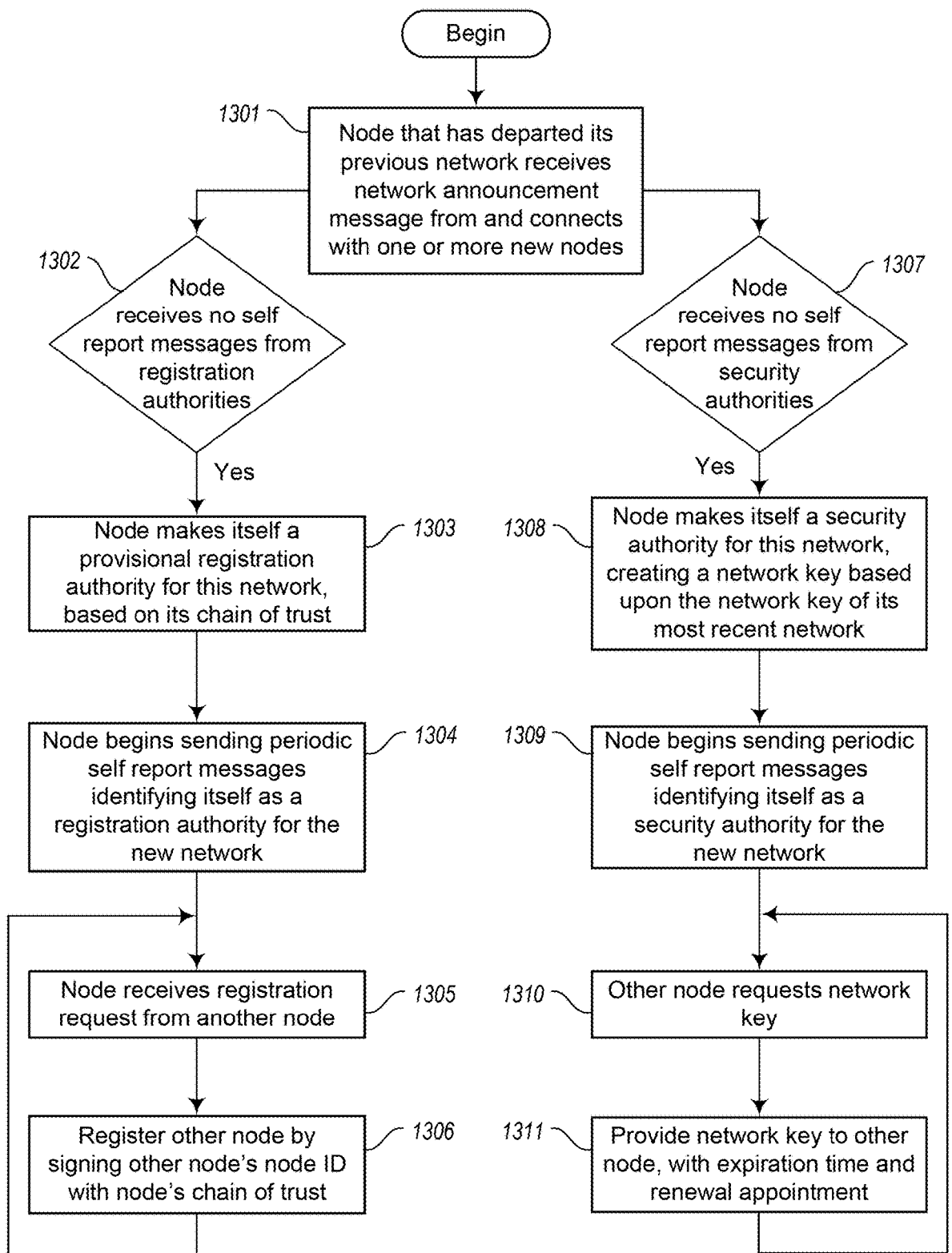
FIG. 13 is a flow diagram showing a process performed by the facility in some embodiments when a node no longer in contact with its previous network encounters one or more other nodes.

FIG. 13 is a flow diagram showing a process performed by the facility in some embodiments when a node no longer in contact with its previous network encounters one or more other nodes. In some embodiments, the acts shown in FIG. 13 are performed by code of the facility executing on the arriving node. In act 1301, the arriving node receives network announcement messages, such as notification signals, from one or more new nodes, in response connecting with each. Proximate to this time, the arriving node monitors for self report messages from registration authorities or security authorities. In the example, arriving node D connects with new nodes E and F, and receives no self-report messages from registration authorities or security authorities. After act 1301, the facility continues in both act 1302 and act 1307.

In act 1302, if the arriving node receives no self report messages from registration authorities, then the facility continues in act 1303. In act 1303, the facility in the arriving node makes itself a provisional registration authority for a new network that will support communication with the new nodes: while the arriving node's chain of trust enables it to share trust with other nodes such as the new nodes, the arriving node has no license to administer, which prevents it from being able to authoritatively determine whether it is proper to permit the new nodes to operate on a network. Accordingly, the arriving node provides provisional registration that will enable the new nodes to operate on a new network; this provisional registration may either be ratified or revoked when the provisionally-registered nodes encounter a registration authority that possesses and is administering a license. In the example, node D makes itself a provisional registration authority. In some embodiments, the new network is indistinguishable to node D from network ABCD, and node D uses the network identifier that was used to identify network ABCD to identify the new network.

Figure 14:
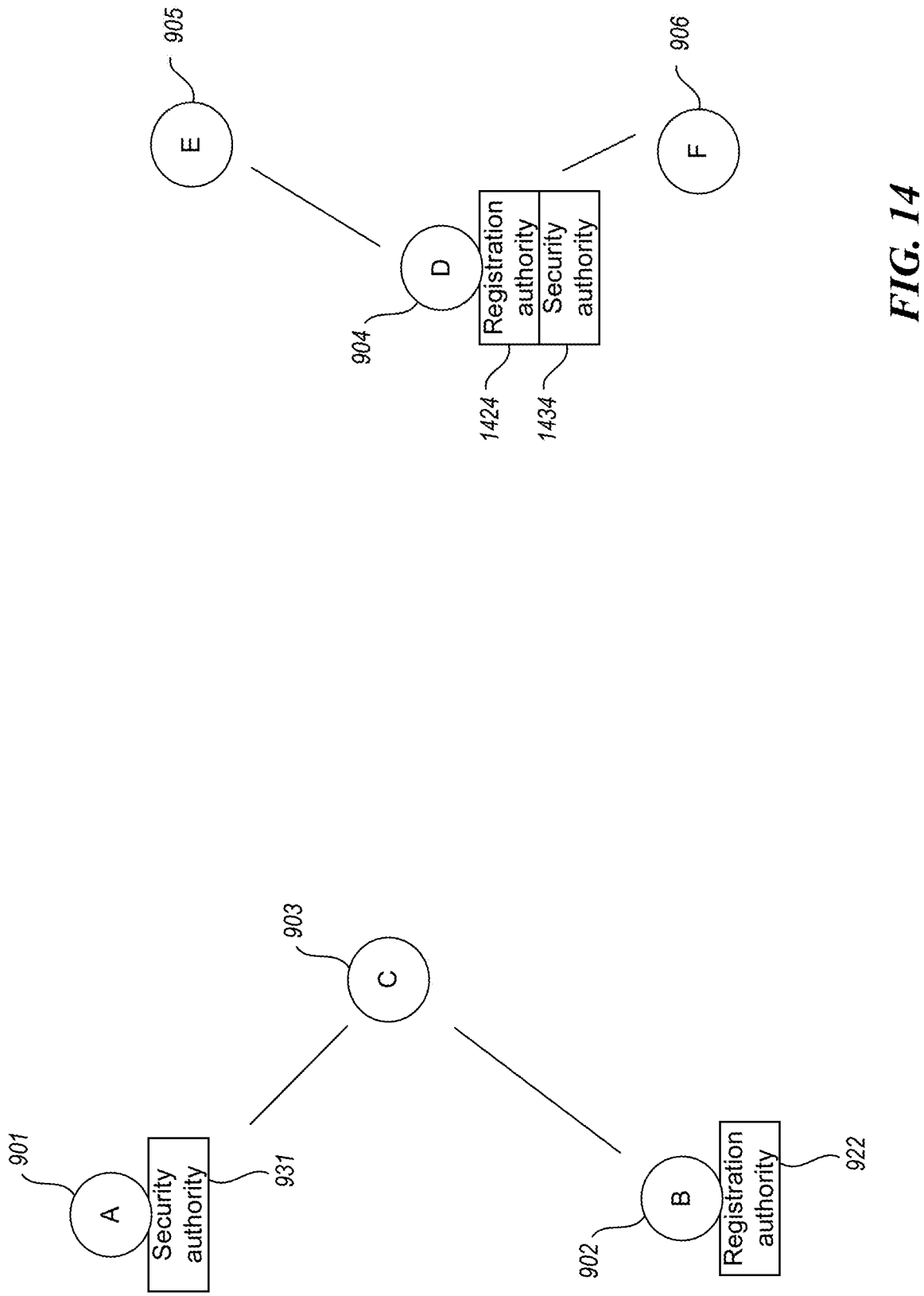
FIG. 14 is a network diagram showing a sample environment in which the facility performs coordinated dynamic emergence, synchronization, and consolidation of registration and security authorities, at a fourth time later than the third time shown in FIG. 12.

FIG. 14 is a network diagram showing a sample environment in which the facility performs coordinated dynamic emergence, synchronization, and consolidation of registration and security authorities, at a fourth time later than the third time shown in FIG. 12. By comparing FIG. 14 to FIG. 12, it can be seen that node D has promoted itself to registration authority 1424 and security authority 1434.

Returning to FIG. 13, in act 1304, the arriving node begins sending periodic self report messages that identify itself as a registration authority. In act 1305, the arriving node receives a registration request from another node. In the example, node D receives a registration request from node E in a first iteration of act 1305, and a registration request from node F in a second iteration of act 1305. In act 1306, the facility in the arriving node registers the node from which a registration request was received in act 1305 using the arriving node's chain of trust. In some embodiments, this involves signing a device ID for the arriving node received as part of the registration request with the arriving node's chain of trust. In the example, node D does the following with respect to node E in the first iteration of act 1306: (1) create a chain of trust for node E by signing node E's device ID with node D's chain of trust; (2) add node E to a list of nodes registered by node D; and (3) reply to node E with node E's chain of trust. In a second iteration of act 1306, node D performs these same steps for node F. After act 1306, the facility continues in act 1305 to receive a registration request from another node.

In act 1307, if the arriving node receives no self report messages from security authorities, then the facility continues in act 1308. In act 1308, the facility in the arriving node makes the arriving node a security authority for the new network. This involves creating a network key for the new network that is based upon the network key of the arriving node's most recent network. In the example, node D makes itself a security authority for the new network, and creates a network key for the new network based upon the network key it received from node A for network ABCD. In act 1309, the arriving node begins sending periodic self report messages that identify itself as a security authority. In act 1310, the arriving node receives a request for a network key from another node that includes the requesting node's chain of trust. In the example, node D receives a key request from node E in a first iteration of act 1310, and a key request from node F in a second iteration of act 1310. In act 1311, in response to analyzing the requesting node's chain of trust and finding it adequate, the facility in the arriving node provides a network key to the node that requested it in act 1310, along with an expiration time of the network key and a renewal appointment specifying when the network key should be renewed in advance of its expiration. In the example, in a first iteration of act 1311, node D provides a network key to node E; in a second iteration, node D provides the network key to node F. In various embodiments, network keys provided to different nodes are either the same or different. After act 1311, the facility continues in act 1310 to receive and process additional network key requests.

Figure 15:
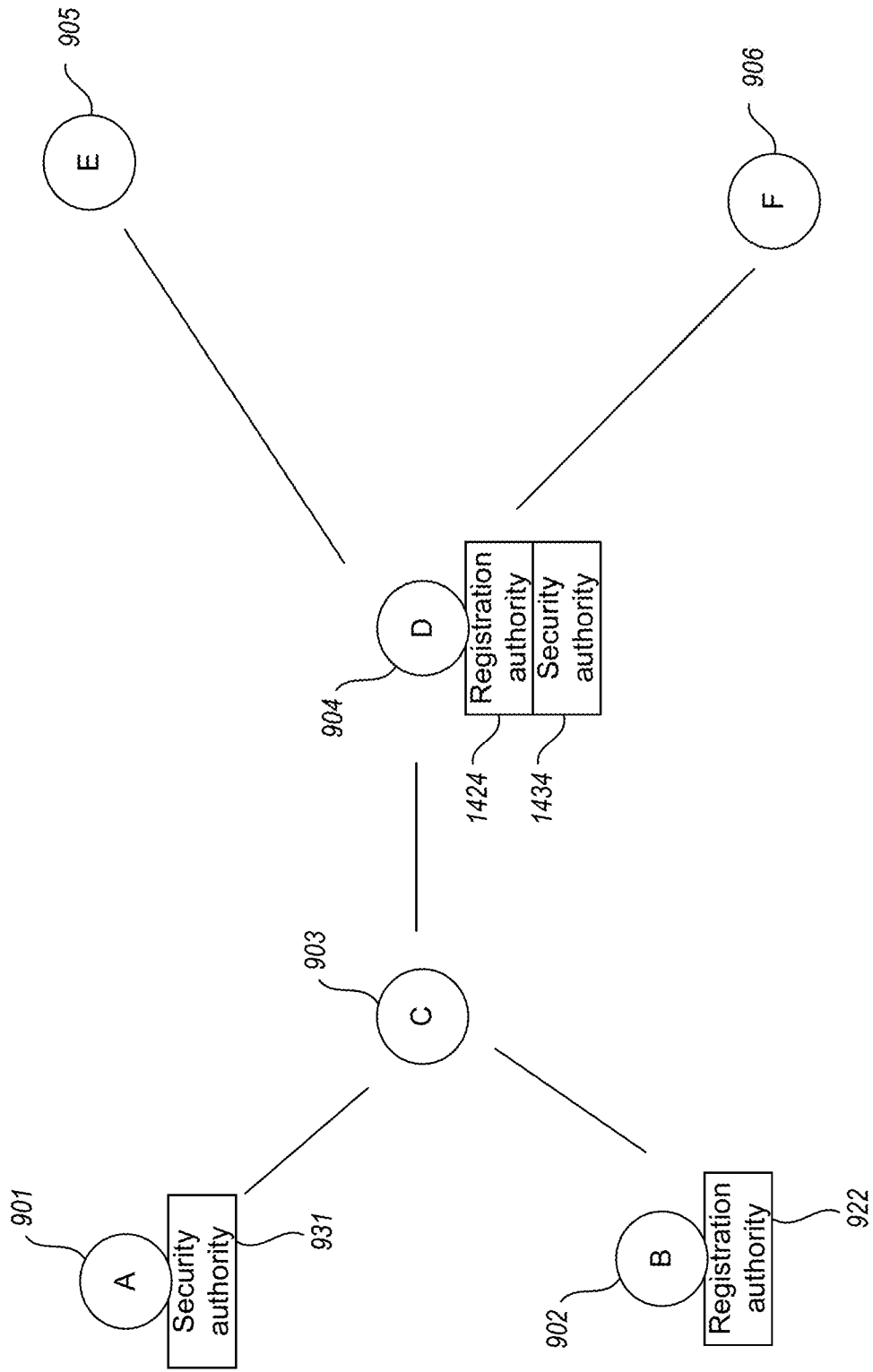
FIG. 15 is a network diagram showing a sample environment in which the facility performs coordinated dynamic emergence, synchronization, and consolidation of registration and security authorities, at a fifth time later than the fourth time shown in FIG. 14.

FIG. 15 is a network diagram showing a sample environment in which the facility performs coordinated dynamic emergence, synchronization, and consolidation of registration and security authorities, at a fifth time later than the fourth time shown in FIG. 14. By comparing FIG. 15 to FIG. 14, it can be seen that node D has moved into an intermediate position where it can connect to nodes C, E, and F. A process performed by the facility in response to the connection of node D to node C is described below in connection with FIG. 16.

Figure 16:
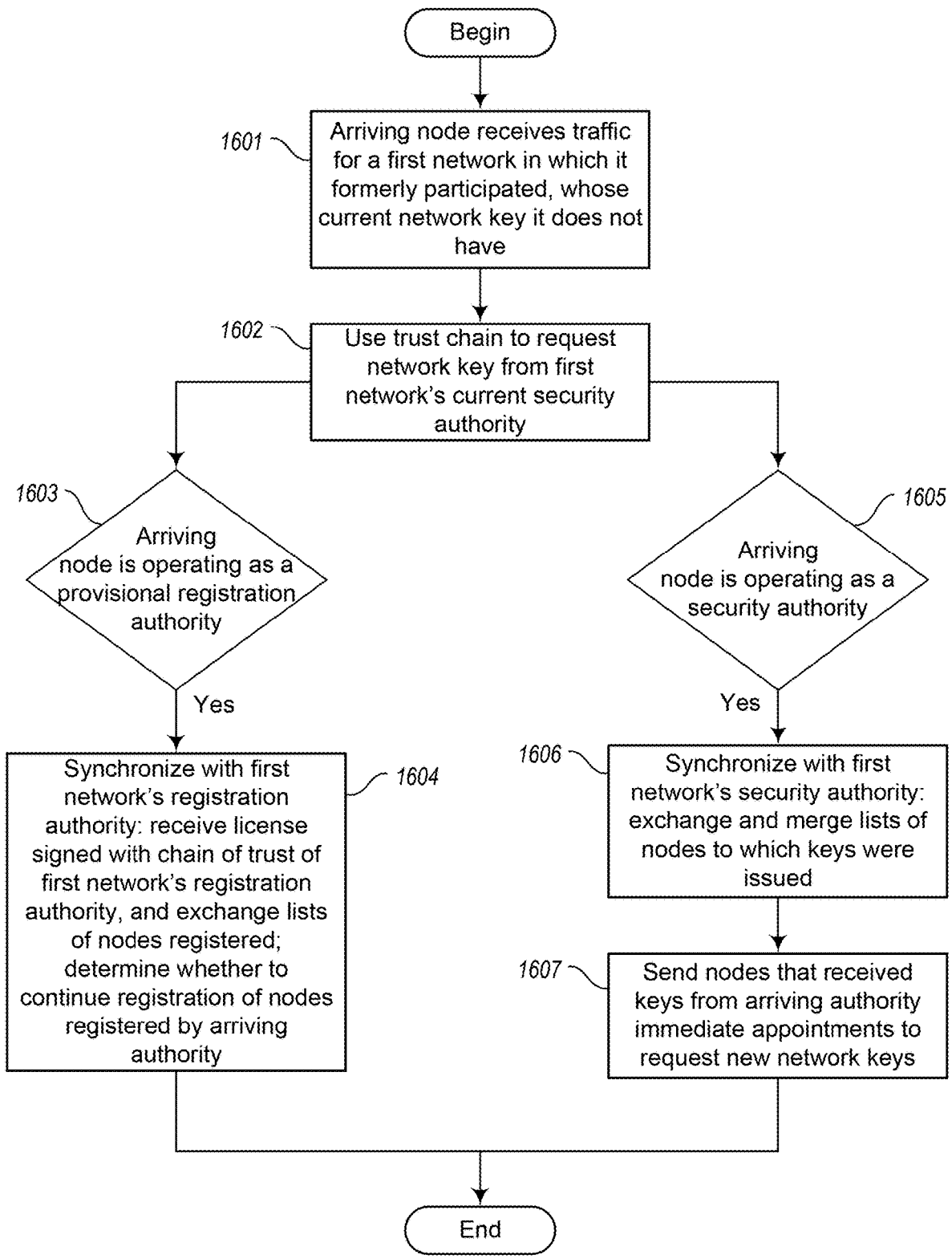
FIG. 16 is a flow diagram showing a process performed by the facility in some embodiments when a node that has promoted itself to security authority and provisional registration authority while away from a previous network returns to the previous network.

FIG. 16 is a flow diagram showing a process performed by the facility in some embodiments when a node that has promoted itself to security authority and provisional registration authority while away from a previous network returns to the previous network. In some embodiments, the acts shown in FIG. 16 are performed by code of the facility executing on the returning node, also referred to as the "arriving node," "arriving security authority," "arriving provisional registration authority," or "arriving security authority and provisional registration authority." In act 1601, the facility in the arriving node returns to a first network in which it formerly participated, whose current network key it does not have as the result of not receiving one or more new network keys created for the first network since departing the first network. In the example, node D returns to network ABCD. The latest network key for network ABCD possessed by node D has expired in accordance with the expiration time set at its issuance by node A, and is no longer being used as network ABCD's network key. In act 1602, the facility in the arriving node uses its trust chain to request a current network key from a current security authority of the first network. In some embodiments, because the arriving node's trust chain traverses through the registration authority for the first network, the current security authority for the first network finds the arriving node's trust chain to be adequate, and provides a current network key to the arriving node, together with an expiration time and renewal appointment for the network key. In the example, node A provides the current network key to node D. After act 1602, the facility continues in both act 1603 and act 1605.

In act 1603, if the arriving node is operating as a provisional registration authority, then the facility continues in act 1604. In act 1604, the facility in the arriving node synchronizes with the first network's current registration authority. In some embodiments, this involves: (1) receiving from the first network's current registration authority a copy of the license being administered by the first network's current registration authority, signed with the first network's registration authority's chain of trust; (2) exchanging the lists of nodes registered by the two registration authorities; and (3) determining by the first network's current registration authority whether the provisional registrations of the nodes registered by the arriving provisional registration authority should be ratified or revoked, based upon whether admitting these nodes would be within the terms of the license being administered in the first network. Based upon this determination, the provisionally registered nodes are either removed from the registration lists, or retained on the registration lists. In some embodiments, where the provisionally registered nodes are ratified, they receive new chains of trust from one of the registration authorities. In the example, node D synchronizes with node B, and they decide the registration fates of nodes E and F. After act 1604, this process concludes.

In act 1605, if the arriving node is operating as a security authority, then the facility continues in act 1606. In act 1606, the facility in the arriving node synchronizes with the first network's current security authority. In some embodiments, this involves: (1) exchanging lists of the nodes to which the two security authorities have provided network keys; and (2) merging these lists. In the example, node D synchronizes with node A. In act 1607, the facility in either of the arriving node or the first network's current security authority sends nodes that received network keys from the arriving node (in other words, nodes that were on the arriving security authority's node list and that were not on the current security authority's node list before the two node lists were merged) immediate appointments to request new network keys. In various embodiments, the appointments direct their recipients to retrieve a key from either of the security authorities. When the nodes that receive these appointments keep them, they will receive a current key for the first network, and be able to encrypt and decrypt messages sent on the first network. In the example, node D or node A and these appointments to nodes E and F; the appointments may direct the retrieval from either node D or node A. After act 1607, this process concludes.

After synchronization has completed, the network has multiple registration authorities and multiple security authorities that all have the state needed to properly perform their functions. Any of these authorities may decide to withdraw from these authority roles. In some embodiments, the facility in each security or registration authority makes this determination based on such factors as an assessment of supply versus demand of the corresponding network service; whether the participant is well-suited to continue as an authority of this type, such as by having an adequate supply of the computing or other resources needed to perform the service, is in a better physical location to provide the service, is in a better work logical location in a graph of the connections that make up the network, etc. In various embodiments, the facility's determination is based on or unrelated to changes that occur in the network's topology. To the extent that multiple registration authorities or multiple security authorities continue to operate in the network, they undertake an ongoing synchronization process in which they update each other on changes to their node lists; this ensures that they continue to have the state needed to properly perform their functions. In some embodiments, each security authority's creation of a new network key is deterministic based upon the value of the last network key, which enables multiple security authorities operating in parallel in a network to each arrive at the same "next" network key on their own.

Figure 17:
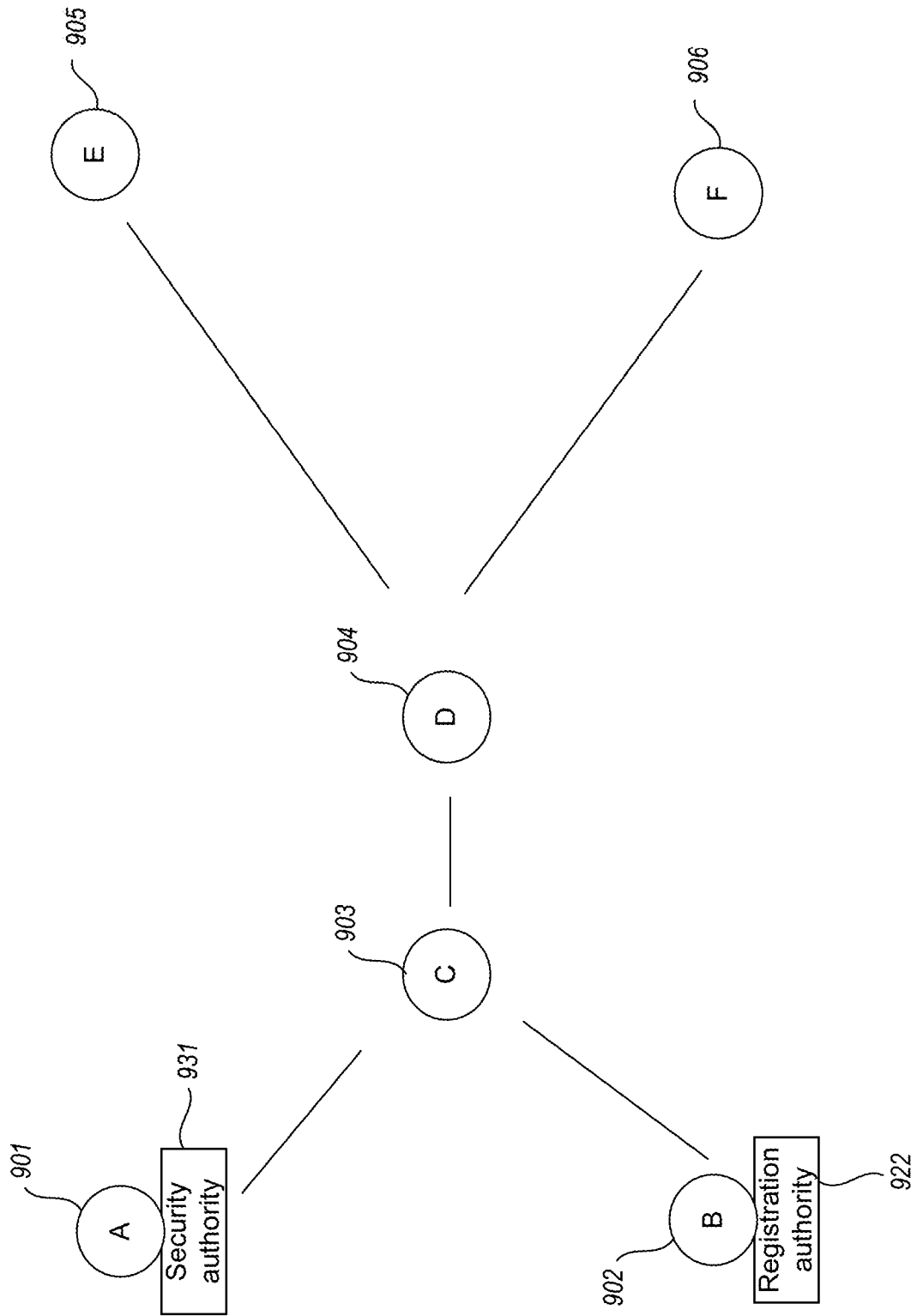
FIG. 17 is a network diagram showing a sample environment in which the facility performs coordinated dynamic emergence, synchronization, and consolidation of registration and security authorities, at a sixth time later than the fifth time shown in FIG. 15.

FIG. 17 is a network diagram showing a sample environment in which the facility performs coordinated dynamic emergence, synchronization, and consolidation of registration and security authorities, at a sixth time later than the fifth time shown in FIG. 15. By comparing FIG. 17 to FIG. 15, it can be seen that node D has relinquished its role as registration authority, and its role as security authority. In this situation, node A is again the only security authority in this network, and node B is again the only registration authority; node a will solely provide security services to nodes A-F and new nodes that join the network, and node B will solely provide registration services to nodes A-F and new nodes that join the network.

Figure 18:
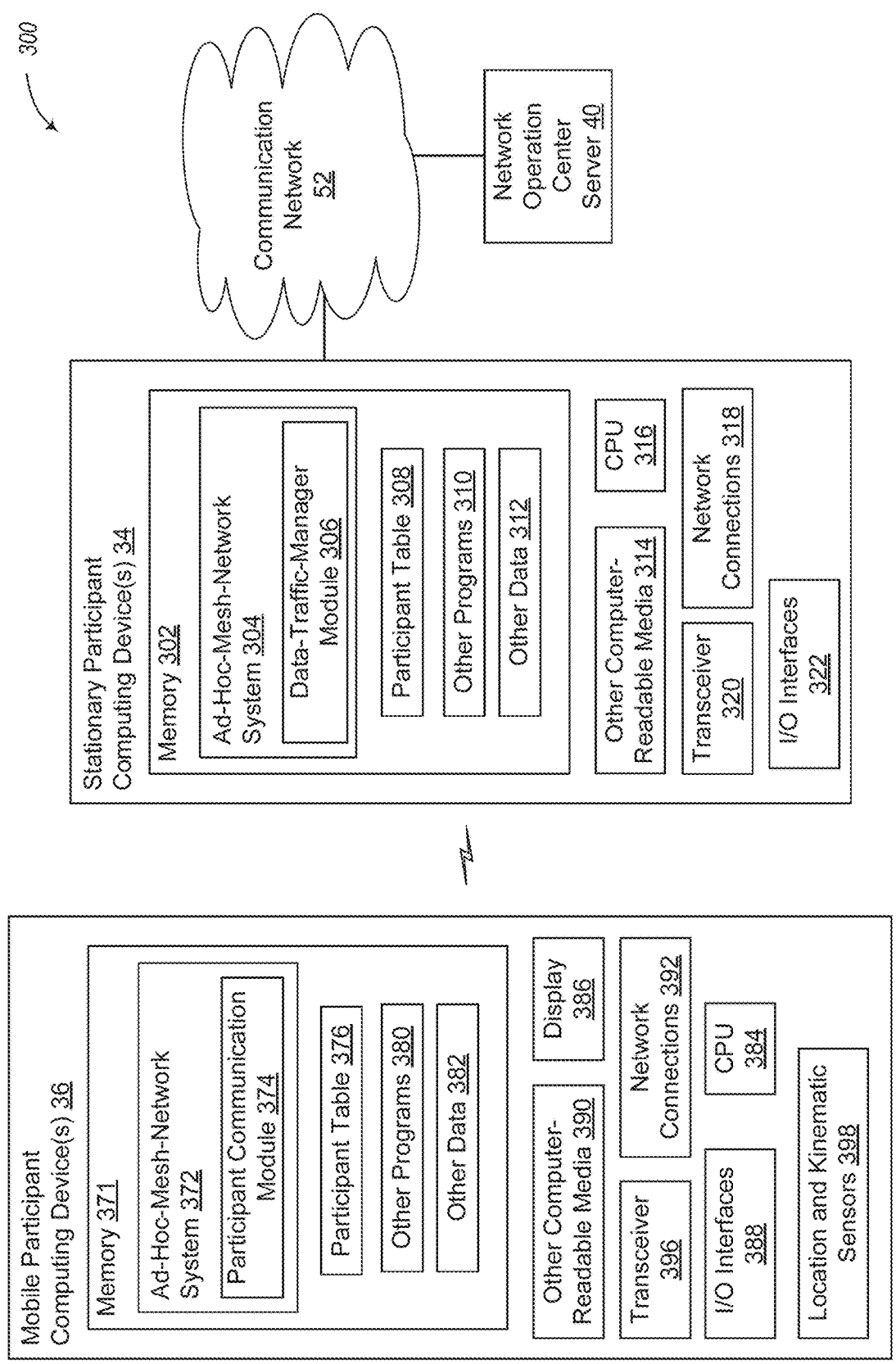
FIG. 18 shows a system diagram that describes one implementation of computing systems for implementing embodiments described herein.

FIG. 18 shows a system diagram that describes one implementation of computing systems for implementing embodiments described herein. System 300 includes mobile participant computing device(s) 36, stationary participant computing device(s) 34, and network operation center server 40.

Mobile participant computing device(s) 36 communicate with one or more other mobile participant computing devices 36 and stationary participant computing devices 34 via line-of-sight communications to transmit data and other communications among the participants. One or more special-purpose computing systems may be used to implement each mobile participant computing device 36. Accordingly, various embodiments described herein may be implemented in software, hardware, firmware, or in some combination thereof. A mobile participant computing device 36 may include memory 371, one or more central processing units (CPUs) 384, display 386, I/O interfaces 388, other computer-readable media 390, network connections 392, transceiver 396, and motion sensors or other sensors 398.

Memory 371 may include one or more various types of non-volatile and/or volatile storage technologies. Examples of memory 371 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 371 may be utilized to store information, including computer-readable instructions that are utilized by CPU 384 to perform actions, including embodiments described herein.

Memory 371 may have stored thereon ad-hoc-mesh-network system 372, which includes participant communication module 374. The participant communication module 374 may employ embodiments described herein to send notification signals, track participants via participant table 376, and to generate and transfer data and communications to other participants.

The memory 371 also stores participant table 376. In various embodiments, this is a local version of the participant table generated by the mobile participant or received from a stationary participant 34 or other mobile participant 36. The participant table 376 may be a partial version or a complete version of the participant table 308 maintained by the stationary participants 34 or by mobile participants if stationary participants are unavailable.

The memory 371 may also store other programs 380 and other data 382. The other programs 380 may include user applications, other tracking or geo-positioning programs, etc. The other data 382 may include data or information regarding one or more non-participant objects or other information.

Network connections 392 are configured to communicate with other computing devices, such as other mobile participant computing devices 36 and stationary participant computing devices 34 via transceiver 396 and line-of-sight communications mechanisms and technologies. Transceiver 396 may be a omni-directional transceiver that sends and receives radio signals independent of direction, or transceiver 396 may be a directional transceiver that sends or receives, or both sends and receives, radio signals to or from a particular direction relative to the positioning of the mobile participant computing device 36.

Location and kinematic sensors 398 include one or more sensors that are used to determine the position of the mobile participant computing device 36 and the kinematic information of how the mobile participant computing device 36 is moving. Examples of location and kinematic data sensors 398 include, but are not limited to using participant's self-reported notifications calibrated off of stationary participants, processing the echo of own self-reported notifications, GPS modules, accelerometers, gyroscopes, or other sensors that can be used to determine the position and kinematic information of the mobile participant computing device 36.

Other I/O interfaces 322 may include a keyboard, audio interfaces, video interfaces, or the like. Other computer-readable media 390 may include other types of stationary or removable computer-readable media, such as removable flash drives, external hard drives, or the like. Display 386 is a display interface that is configured to output images, content, or information to a user. Examples of display 386 include, but are not limited to, LCD screens, LEDs or other lights, or other types of display devices.

Stationary participant computing device(s) 34 communicate with mobile participant computing devices 36 via line-of-sight communications and with other stationary participants either by wired or wireless communications to transmit information or data to other participants or to non-participants. One or more special-purpose computing systems may be used to implement each stationary participant computing device 34. Accordingly, various embodiments described herein may be implemented in software, hardware, firmware, or in some combination thereof. A stationary participant computing device 34 may include memory 302, one or more central processing units (CPUs) 316, I/O interfaces 322, other computer-readable media 314, network connections 318, and transceiver 320.

Memory 302 may include one or more various types of non-volatile and/or volatile storage technologies. Examples of memory 302 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 302 may be utilized to store information, including computer-readable instructions that are utilized by CPU 316 to perform actions, including embodiments described herein.

Memory 302 may have stored thereon ad-hoc-mesh-network system 304, which includes data-traffic-manager module 306. The data-traffic-manager module 306 may employ embodiments described herein to transfer data from one participant to another participant and to manage and provide participant table updates. In various embodiments, data-traffic-manager module 306 may communicate with network operation center server 40 via communication network 52, such as to provide or receive participant table updates.

The memory 302 may also store participant table 308, other programs 310, and other data 312. The participant table 308 may be a full version of the participant table 308 or it may be a partial version based on those mobile participants 36 within line-of-sight of or a threshold number of hops from the stationary participant 34. The other data 312 may include data or information regarding one or more tracked objects or other information.

Network connections 318 are configured to communicate with other computing devices, such as other stationary participant computing devices 34 and mobile participant computing devices 36 via transceiver 320 and wired or line-of-sight communications mechanisms and technologies. Network connections 318 are also configured to communicate with the network operation center server 40 via communication network 52.

Transceiver 320 may be a omni-directional transceiver that sends and receives radio signals independent of direction, or transceiver 320 may be a directional transceiver that sends or receives, or both sends and receives, radio signals to or from a particular direction relative to the position of the stationary participant computing device 34.

Other I/O interfaces 322 may include a keyboard, audio interfaces, video interfaces, or the like. Other computer-readable media 314 may include other types of stationary or removable computer-readable media, such as removable flash drives, external hard drives, or the like.

Network operation center server 40 includes one or more computing devices that store information about the positioning of mobile participant computing devices 36 and stationary participant computing devices 34, such as a master participant table. The network operation center server 40 may also store information regarding the positioning and movement of non-participant objects that are reported to it by the mobile participant computing devices 36 or the stationary participant computing devices 34. The network operation center server 40 also includes memory, one or more processors, network interfaces and connections, and other computing components similar to mobile participant computing devices 36 and stationary participant computing devices 34, but those components are not shown here for ease of illustration.

Communication network 52 may include one or more wired or wireless communication networks to transmit data between one stationary participant computing device 34 and another stationary participant computing device 34 or with the network operation center server 40.

One non-limiting non-exhaustive example of components utilized by mobile participants may include, but is not limited to: an adaptive power backup generator, cognitive multi-spectral antennas×6, 42U rack, rack mounted server, integrated processor chip, SSL & VPN appliance, external firewall appliance, internal firewall appliance, load management appliance, web filter appliance, multi-spectral cognitive Radio×4, High throughput router, smart power strip/UPS, mesh network Wi-Fi appliances, small mesh network home appliances, wireless access points with public address appliances, and backhaul connectivity.

In various embodiments, communications between participants may include one or multi-level security. For example, in some embodiments, all transmission via the participant network may employ a first encryption or security mechanism. Some communications between participants may further include another layer of security. For example, a user may have a cell phone and a home network. The cell phone may be a mobile participant and a router on the home network may be a participant access node. The home network may be protected by Wired Equivalent Privacy (WEP), Wi-Fi Protected Access (WPA), Wi-Fi Protected Access II (WPA2), or other security mechanism. In this example, the cell phone participant may first encrypt communications via the same security mechanism as the home network and then encrypt the communications using the network encryption. The cell phone participant employs embodiments described herein to route the encrypted communications to the router participant, which can decrypt the communication using the network encryption mechanism and then the home network security mechanism. Even additional layers of encryption and security can be employed for a group of users or devices, subsets of users in the group, individuals in those subsets, etc.

The various embodiments described above can be combined to provide further embodiments. These and other changes can be made to the embodiments in light of the above-detailed description. Moreover, additional details and use case examples are provided in the U.S. patents, U.S. patent application publications, U.S. patent applications, foreign patents, foreign patent applications and non-patent publications referred to in this specification and/or listed in the Application Data Sheet, including but not limited to U.S. patent application Ser. No. 15/892,259, filed Feb. 8, 2018, entitled "Object Tracking Using A Cognitive Heterogeneous Ad Hoc Mesh Network" and Provisional U.S. Patent Application Ser. No. 62/467,572, filed Mar. 6, 2017, entitled "Scatternet: A cognitive heterogeneous ad hoc mesh data/cellular/Wi-Fi network establishment/access points/connected devices through utilization of software applications exploiting existing technologies and frequency spectrum for data and voice communications through the exploitation of the Internet and Internet of Things, resulting in the creation of Data communications Adaptive RADAR (DATAR)," are incorporated herein by reference, in their entirety.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a first communication device, the method comprising:
obtaining a chain of trust from a registration authority for a first network in which a first plurality of communication devices participate, the chain of trust traversing from the first communication device through the registration authority for the first network to a trust root;
obtaining a network key from a security authority for the first network;
at a time after obtaining the chain of trust and the network key when the registration authority and security authority for the first network are not accessible to the first communication device, receiving communication from a second communication device not among the first plurality of communication devices;
in response to the received communication:
provisionally registering the second communication device;
determining a network key that is based on the obtained network key and different from the obtained network key; and
based upon the provisional registration, providing to the second communication device the determined network key; and
after the provisionally registering and the providing:
making direct or indirect wireless connections to the registration authority for the first network and the security authority for the first network; and
in response to making direct or indirect wireless connections to the registration authority for the first network and the security authority for the first network;
communicating with the registration authority for the first network to identify the second communication device to the registration authority for the first network; and
communicating with the security authority for the first network to identify the second communication device to the security authority for the first network.

2. The method of claim 1, further comprising, in response to the received communication:
receiving a message from the second communication device encrypted with the provided network key.

3. The method of claim 1, further comprising:
in response to making direct or indirect wireless connections to the registration authority for the first network and the security authority for the first network:
retrieving a current network key for the first network from the security authority for the first network; and
providing the current network key for the first network to the second communication device.

4. The method of claim 3, further comprising:
receiving a message originated by the second communication device encrypted using the provided current network key for the first network.

5. One or more memories collectively having contents configured to cause a processor to perform a method, the method comprising:
making direct or indirect wireless connections between a first communication device and each of one or more additional communication devices;

determining that no registration authority is available to provide trust to the one or more additional communication devices;
in response to the determining:
appointing the first communication device provisional registration authority; and
enabling the first communication device to, as provisional registration authority, provisionally register the one or more additional communication devices for participation in a first network;
after the provisionally registering:
making direct or indirect wireless connections to a registration authority of a second network, wherein the first communication device formerly participated in the second network and wherein and the second network is no longer accessible to the first communication device; and
in response to making direct or indirect wireless connections to the registration authority of the second network communicating, in its role as provisional registration authority for the first network, with the registration authority for the second network to synchronize registration time.

6. The one or more memories of claim 5, wherein the processor is installed in the first communication device.

7. The one or more memories of claim 5, wherein the first communication device received, as part of its registration in the second network, a chain of trust traversing a registration authority of the second network,
and wherein the provisional registration comprises, for each of the one or more additional communication devices:
using the chain of trust received by the first communication device to formulate a chain of trust for the additional communication device that traverses from the additional communication device through the first node and the registration authority of the second network; and
sending the formulated chain of trust to the additional communication device.

8. The one or more memories of claim 7, wherein the provisional registration further comprises, for each of the one or more additional communication devices:
receiving from the additional communication device a device ID identifying the additional communication device,
and wherein the formulating comprises:
using the chain of trust received by the first communication device to formulate the registration token validating the device ID identifying the additional communication device.

9. One or more memories collectively having contents configured to cause a processor to perform a method, the method comprising:
making direct or indirect wireless connections between a first communication device and each of one or more additional communication devices;
determining that no security authority is available to provide network keys to the one or more additional communication devices; and
in response to the determining:
appointing the first communication device security authority; and
enabling the first communication device to, as security authority, based upon the provisional registration of the one or more additional communication devices, provide to the one or more additional communication devices network keys usable to secure communication among the one or more additional communication devices and the first communication device, including:
providing a first network key of the first network to each of the one or more additional communication devices, wherein the first network key is based on, but different from, a second network key received by the first communication device as part, of its participation in a second network, and wherein the first communication device formerly participated in the second network and the second network is no longer accessible to the first communication device.

10. The one or more memories of claim 9, wherein the processor is installed in the first communication device.

11. The one or more memories of claim 9, the method further comprising:
receiving from a second communication device among the one or more additional communication devices a message encrypted with the network key provided to the second communication device by the first communication device.

12. The one or more memories of claim 9, the method further comprising, after the providing:
making direct or indirect wireless connections to a security authority of the second network; and
in response to making direct or indirect wireless connections to the security authority of the second network:
in its role as security authority for the first network, communicating with the security authority for the second network to synchronize security state.

13. The one or more memories of claim 12, the method further comprising, after synchronizing security state, sending to a second communication device among the one or more additional communication devices a current network key usable by the second communication device to communicate with both the one or more additional communication devices and nodes of the second network.

14. A first communication device, comprising:
a radio;
one or more processors; and
memory having contents configured to cause the processor to perform a method, the method comprising:
using the radio to transmit to a second communication device a device ID and validation identifying the first communication device;
using the radio to receive from the second communication device a first chain of trust through the second communication device to the first communication device connoting authority for the first communication device to participate in a first network in which the second communication device has appointed itself registration authority at a time when the second communication device did not possess a registration license, wherein the first chain of trust is the device ID identifying the first communication device and is signed with a second chain of trust issued to the second communication on device as part of its previous registration for a second network;
using the radio to receive from the second communication device a network key usable to secure communication among nodes of the first network; and
storing the received chain of trust and network key.

15. The first communication device of claim 14, the method further comprising:

using the radio to receive a message originated by a node of the first network; and using the stored network key to decrypt the received message.

16. The first communication device of claim 14, wherein the network key received from the second communication device is derived from a network key that the second communication device received to use in its previous participation in a second network.

17. The first communication device of claim 14, the method further comprising:

using the radio to receive from the second communication device a key renewal appointment message instructing the first communication device to immediately retrieve a new network key;

in response to receiving the key renewal appointment message, using the radio to retrieve a new network key;

receiving a message from a node of a second network in which the second indication device was previously a participant; and using the retrieved new network key to decrypt the message received from the node of the second network.

18. A method in a first communication device, comprising:

making a direct or indirect wireless connection with a participant in a first network in which the first communication device was formerly a participant;

in response to making the connection:

communicating with a registration authority of the first network to synchronize a provisional registration authority state established by the first communication device during a period after the first communication device was formally a participant in the first network and before the connection was made; and communicating with a security authority of the first network to synchronize a security authority state established by the first communication device during the period;

using a chain of trust received from the registration authority of the first network to request a current network key for the first network from the security authority of the first network;

receiving a current network key for the first network from the security authority of the first network; and storing the received current network key for the first network.

19. The method of claim 18, wherein the provisional registration authority state comprises a list of nodes registered by the first communication device for a second network distinct from the first network, and wherein synchronizing the provisional registration authority state comprises exchanging with the registration authority of the first network (1) a list of nodes registered for the second network by the first communication device, and (2) a list of nodes registered for the first network by the registration authority of the first network.

20. The method of claim 19, wherein synchronizing the provisional registration authority state further comprises:

receiving from the registration authority of the first network a registration license used by the registration authority of the first network to determine whether to register nodes to the first network; and storing the received registration license for application by the first communication device.

21. The method of claim 18, wherein the security authority state comprises a list of nodes to which network keys were provided by the first communication device for a second network distinct from the first network, and wherein synchronizing the security authority state comprises exchanging with the security authority of the first network (1) a list of nodes provided network keys for the second network by the first communication device, and (2) a list of nodes provided keys for the first network by the security authority of the first network.

22. The method of claim 18, wherein the security authority state comprises a list of nodes to which network keys were provided by the first communication device for a second network distinct from the first network, the method further comprising:

after storing the received current network key,
for each of the nodes on the list:
sending to the node a key renewal appointment message instructing the node to immediately retrieve a new network key;
receiving a key renewal request from the node; and
responding to the received key renewal request with the stored current network key for the first network.

* * * * *